United States Patent [19]

Blake et al.

[11] Patent Number: 5,327,213
[45] Date of Patent: Jul. 5, 1994

[54] CONFIGURATION CONTROL OF MODE COUPLING ERRORS

[75] Inventors: James N. Blake; John R. Feth, both of Phoenix, Ariz.

[73] Assignee: Honeywell Inc., Minneapolis, Minn.

[21] Appl. No.: 791,719

[22] Filed: Nov. 14, 1991

[51] Int. Cl.$^5$ .............................................. G01B 9/02
[52] U.S. Cl. ...................................................... 356/350
[58] Field of Search ......................................... 356/350

[56] References Cited

U.S. PATENT DOCUMENTS

| | | | |
|---|---|---|---|
| 4,400,088 | 8/1983 | Schiffner et al. | 356/350 |
| 4,759,629 | 7/1988 | Everest et al. | 356/350 |
| 4,881,817 | 11/1989 | Kim et al. | 356/350 |
| 5,046,808 | 9/1991 | Chang | 385/13 |
| 5,120,130 | 6/1992 | Bergh | 356/350 |

OTHER PUBLICATIONS

"The Temporal Coherence of Various Semiconductor Light Sources Used in Optical Fiber Sensors," R. Epworth, *Fiber-Optic Rotation Sensors and Related Technology*, Published by Springer-Verlag, Berlin, Germany, 1982, pp. 237-244.
"Fiber-ring Interferometer: Polarization Analysis," R. Ulrich et al, *Optics Letters*, vol. 4(5), 1979, pp. 152-154.
"Polarization Control in Optical-fiber Gyroscopes," E. Kintner, *Optics Letters*, vol. 6(3), 1981, pp. 154-156.
"Polarization and Depolarization in the Fiber-Optic Gyroscope," R. Ulrich, *Fiber-Optic Rotation Sensors and Related Technologies*, Springer-Verlag Berlin Heidelberg, 1982, pp. 52-77.
"Birefringence and Polarization Effects in Fiber Gyroscopes," G. Pavlath et al, *Applied Optics*, vol. 21(10), 1982, pp. 1752-1757.
"Polarization Requirements for Fiber Gyroscopes with High-Birefringence Fiber and Broad-Band Sources," W. Burns et al, *Journal of Lightwave Technology*, vol. LT-2(4), 1984, pp. 430-435.
"Fiber Gyroscope With Birefringence Modulation," S. Carrara et al, SPIE vol. 719, *Fiber Optic Gyros: 10th Anniversary Conference*, 1986, pp. 45-52.
"Phase Error Bounds of Fiber Gyro with Polarization-Holding Fiber," W. Burns, *Journal of Lightwave Technology*, vol. LT-4(1), 1986, pp. 8-14.
"Bias Reduction by Polarisation Dispersion in the Fibre-Optic Gyroscope," E. Jones et al, *Electronics Letters*, vol. 22(1), 1986, pp. 54-56.
"Effect of Random Inhomogeneities in a Fiber Lightguide on the Null Shift in a Ring Interferometer," S. Kozel, *Optics and Spectroscopy*, vol. 61(6), 1986, pp. 814-816.
"Bias Drift Reduction in Polarization-Maintaining Fiber Gyroscope," S. Carrara et al, *Optics Letters*, vol. 12(3), 1987, pp. 214-216.
"The Depolarized Fiber-optic Gyro for Future Tactical Applications," M. Bramson, SPIE vol. 1367 *Fiber Optic and Laser Sensors VIII*, 1990, pp. 155-160.
"Extended Environmental Performance of Attitude and Heading Reference Grade Fiber Optic Rotation Sensors," G. Chin et al, SPIE vol. 1367 *Fiber Optic and Laser Sensors VIII*, 1990, pp. 107-120.

*Primary Examiner*—Mark Hellner
*Attorney, Agent, or Firm*—John G. Shudy, Jr.

[57] ABSTRACT

An optical fiber rotation sensor having configurations thereof chosen with respect to the source autocorrelation. Both amplitude related and intensity related phase errors due to polarization mode coupling can be eliminated or reduced economically.

85 Claims, 9 Drawing Sheets

CONFIGURATION CONTROL OF MODE COUPLING ERRORS

BACKGROUND OF THE INVENTION

The present invention relates to fiber optic gyroscopes used for rotation sensing and, more particularly, to interferometric fiber optic gyroscopes.

Fiber optic gyroscopes are an attractive means with which to sense rotation. They can be made quite small and still be constructed to withstand considerable mechanical shock, temperature change, and other environmental extremes. In the absence of moving parts, they can be nearly maintenance free, and they have the potential to become economical in cost. They can also be sensitive to low rotation rates which can be a problem in other types of optical gyroscopes.

There are various forms of optical inertial rotation sensors which use the well-known Sagnac effect to detect rotation about a pertinent axis thereof. These include active optical gyroscopes which have the gain medium contained in an optical cavity therein, such as the ring laser gyroscope, and passive optical gyroscopes without any gain medium in the primary optical path, such as the interferometric fiber optic gyroscope and the ring resonator fiber optic gyroscope. The avoidance of having the active medium along the primary optical path in the gyroscope eliminates some problems which are encountered in active gyroscopes, such as low rotation rate lock-in, bias drift and some causes of scale factor variations.

Interferometric fiber optic gyroscopes typically employ a single spatial mode optical fiber of a substantial length, typically 100 to 2,000 meters, which length is formed into a coil by being wound on a core to form a closed optical path. An electromagnetic wave, or light wave, is introduced and split into a pair of such waves to propagate in opposite directions through the coil to both ultimately impinge on a photodetector. Rotation about the sensing axis of the core, or the coiled optical fiber, provides an effective optical path length increase in one rotational direction and an effective optical path length decrease in the opposite rotational direction for one member of this pair of electromagnetic waves. The opposite result occurs for the remaining member of the pair of electromagnetic waves for such rotation. Such path length differences between the pair of electromagnetic waves introduce a phase shift between those waves in interferometric fiber optic gyroscopes in either rotation direction, i.e. the well-known Sagnac effect. The use of a coiled optical fiber is desirable because the amount of phase difference shift due to rotation, and so the output signal, depends on the length of the entire optical path through the coil traversed by the two opposing directional electromagnetic waves. Thus, a relatively large phase shift difference can be obtained in a long optical fiber, but also in the relatively small volume taken by that fiber in its being coiled.

The output current from the photodetector system photodiode in response to the opposite direction traveling electromagnetic waves impinging thereon, after passing through the coiled optical fiber, follows a raised cosine function, that is, the output current depends on the cosine of the phase difference between these two waves. Since a cosine function is an even function, such an output function gives no indication as to the relative direction of the phase difference shift, and so no indication as to the direction of the rotation about the axis. In addition, the rate of change of a cosine function near zero phase value is very small, and so such an output function provides very low sensitivity for low rotation rates.

Because of these unsatisfactory characteristics, the phase difference between the two electromagnetic waves is usually modulated by placing an optical phase modulator on one side of the coiled optical fiber. As a result, one of the opposite direction propagating waves passes through the modulator just after entering the coil, while the other wave, traversing the coil in the opposite direction, passes through the modulator just before exiting the coil. In addition, a phase sensitive demodulator is provided to receive the photodetector output current. Both the optical phase modulator and the phase sensitive demodulator are typically operated by a sinusoidal signal generator, but other waveform types of a similar fundamental frequency can also be used.

The resulting signal output of the phase sensitive demodulator follows a sine function, i.e. the output signal depends on the sine of the phase difference between the two electromagnetic waves impinging on the photodiode, primarily the phase shift due to rotation about the axis of the coil. A sine function is an odd function having its maximum rate of change at zero, and so changes algebraic seen on either side of zero. Hence, the phase sensitive demodulator signal can provide both an indication of which direction a rotation is occurring about the axis of the coil, and the maximum rate of change of signal value as a function of rotation rate near a zero rotation rate. That is, the signal has its maximum sensitivity near zero phase shift so that its output signal is quite sensitive to low rotation rates. This is possible, of course, only if phase shifts due to other sources, that is, errors, are made sufficiently small. In addition, this output signal in these circumstances is very close to being linear at relatively low rotation rates. Such characteristics for the output signal of the phase 10 sensitive demodulator is a substantial improvement over the characteristics of the output current of the photodetector.

Reducing erroneous phase shifts from other sources is, however, a difficult problem in fiber optical gyroscopes. Avoidance of erroneous phase shifts in the electromagnetic waves reaching the photodetector requires that each of the interfering waves have traveled over the same optical path, that is, the electromagnetic wave associated with the clockwise direction of travel from the coil and the one associated with the counterclockwise direction of the coil each must travel over an indistinguishable optical path from the source to the photodetector absent any rotation of the coil. A system with this characteristic is often termed "reciprocal." At a minimum, the optical paths corresponding to the clockwise electromagnetic waves and the counterclockwise electromagnetic waves must be identical on an optical ray tracing basis in the absence of rotation. In meeting this requirement, a "minimum reciprocal configuration" has been found to be as shown in FIG. 1 in connection with the coiled optical fiber 10 shown there.

Coiled optical fiber 10 in FIG. 1 is, as indicated above, wound about a core or spool using a single mode optical fiber wrapped about an axis thereof which becomes the axis about which rotation is to be sensed. The use of a single mode fiber allows the paths of the electromagnetic waves to be defined nearly uniquely, and further allows the phase fronts of a such a guided wave to be defined uniquely. This greatly aids maintaining reciprocity.

In addition, the optical fiber is a so-called polarization-maintaining fiber in that a very significant birefringence is constructed in the fiber so that birefringence introduced by mechanical stress, which is unavoidable, and by the Faraday effect in magnetic fields, or from other sources, and which can lead to randomly varying phase difference shifts, become relatively insignificant. Thus, either the high refractive index axis, i.e. the slower propagation axis, or the low refractive index axis, i.e. the faster propagation axis, is chosen for primarily propagating the electromagnetic waves depending on the other optical components in the system. In the present system, the slow axis has been chosen in view of the optical components used therein, as will be subsequently described, and this slow axis will also be termed the "x" axis. The example given in FIG. 1 will be described with the slow axis always being the primary axis of electromagnetic wave propagation through the various optical fiber portions, but the opposite, fast axis, or "y" axis, could have been chosen, or there could be primary propagation over an optical path through such fiber portions which mixed the fast axis in some parts with the slow axis in other parts.

The coil is typically wound on a spool using the "quadrupole" technique so that similarly located points in the coil are near one another. This reduces the effects of time-varying phenomena, such as thermal gradients, from affecting opposite direction propagating electromagnetic waves differently from one another.

The electromagnetic waves which propagate in opposite directions through coil 10 are provided from an electromagnetic wave source, or light source, 11, in FIG. 1. This source is typically a superluminescent diode or, alternatively, a laser diode operating below its threshold for stimulated emission, either of which provide electromagnetic waves typically in the near-infrared part of the spectrum with a typical wavelength of 830 nm. Source 11 must have a short coherence length for emitted light to reduce the phase shift difference errors between these waves due to Rayleigh and Fresnel scattering at scattering sites in coil 10. Because of the nonlinear Kerr effect in coil 10, differing intensities in the two propagating waves can also lead to phase difference shifts therebetween. This situation can also be aided by the use of a short coherence length source for source 11 which leads to modal phase shift canceling. Rayleigh and Fresnel scattering, and the nonlinear Kerr effect, all lead to non-reciprocal phase shifts between the counter rotating electromagnetic waves in coil 10 even in a minimum reciprocal configuration. A superluminescent diode, or a laser diode operating below threshold, each have a wide emission spectrum compared to that of a laser diode operating past its threshold in the stimulated emission mode of operation.

Between laser diode 11 and fiber optic coil 10 there is shown an optical path arrangement in FIG. 1 formed by an extension of the ends of the optical fiber forming coil 10 to some optical coupling components which separate the overall optical path into several optical path portions. A portion of polarization maintaining optical fiber is positioned against a face of laser diode 11 at a location of optimum light emission therefrom, a point from which it extends to a first optical directional coupler, 12, to be joined thereto. If, on the other hand, coupler 12 is formed by fusing two optical fibers together in a coupling region, the excess length of one optical fiber may be positioned against diode 11 to provide this optical path between diode 11 and this wave coupling region of coupler 12, or the excess length may be spliced to another optical fiber extending from diode 11.

Optical directional coupler 12 has light transmission media therein which extend between four ports, two on each end of that media, and which are provided on each end of coupler 12 in FIG. 1. One of these ports has the optical fiber extending from laser diode 11 positioned thereagainst (or vice versa for a fused coupler). At the other port on the same end of optical coupler 12 there is shown a further polarization maintaining optical fiber positioned thereagainst (or alternatively extending from a fused coupler) which extends to be positioned against the photodiode, 13, which is electrically connected to a photodetection system, 14. In practice, as indicated above, coupler 12 may be formed from fused lengths of such optical fiber so that the remaining lengths past the fused portion, or the light coupling region therein, extend either all the way to laser diode 11 and photodiode 13 or are spliced to other optical fibers extending therefrom.

Photodiode 13 detects electromagnetic waves, or light waves, impinging thereon from the portion of the optical fiber positioned thereagainst (or extending thereto) and provides a photocurrent in response. This photocurrent, as indicated above, in the situation of two nearly coherent electromagnetic waves impinging thereon, follows a raised cosine function in providing a photocurrent output which depends on the cosine of the phase difference between such a pair of electromagnetic waves. Photodiode 13 is operated in either the photovoltaic mode or the photoconductive mode, as needed, into an amplifier circuit of appropriate impedance to provide a photocurrent which is substantially a linear function of the impinging radiation intensity, and is typically a p-i-n photodiode.

Optical directional coupler 12 has another polarization maintaining optical fiber against a port at the other end thereof which extends to a polarizer, 15. Again, the excess length in an optical fiber past the coupling region in coupler 12 may have the end thereof extend all the way to polarizer 15, or may be spliced to another optical fiber portion extending from polarizer 15 with the principal birefringence axes in each such portion of optical fiber closely aligned to those of the other. At the other port on that same side of coupler 12 there is a non-reflective termination arrangement, 16, involving the excess length of one of the optical fibers fused together forming coupler 12 or, again, another optical fiber spliced to such an excess length.

Directional optical coupler 12, in receiving electromagnetic waves, or light, at any port, or at any end of an excess portion of optical fiber extending past the coupling region therein, transmits such electromagnetic waves so that a preselected fraction thereof, typically one-half, appears at each of the two ports, or ends of the two excess optical fiber lengths past the coupling region, which are at the opposite end of coupler 12 from that having the incoming port or excess optical fiber length receiving the incoming waves. On the other hand, no electromagnetic waves are transmitted to the port or excess fiber length which is on the same end of coupler 12 as is the incoming port. The polarization of the incoming electromagnetic waves with respect to the principle birefringent axes at the input port can be fairly well preserved at the corresponding axes of the two output ports, but there will be some coupling of waves between axes in the coupling region of the coupler.

Polarizer 15 is used because, even in a single spatial mode optical fiber, two polarization modes are possible for electromagnetic waves passing through such a fiber, one along each principle birefringent axis. Thus, polarizer 15 is provided for the purpose of transmitting the electromagnetic wave component along one of these axes, or one of these polarization modes, between the optical fibers connected to the ports on either end thereof, i.e. between the slow axes of those fibers as indicated above, while blocking transmission in the other mode between the fast axes of these fibers. Hence, the slow axis of the optical fiber extending from coupler 12 is aligned with the transmission axis of polarizer 15 at a port on one side thereof, or with the slow principal birefringent axis of an optical fiber connection portion extending from polarizer 15 that is closely aligned with the transmission axis of the polarizer. The fast axis of this optical fiber is then closely aligned to the blocking axis at the ports of the polarizer, or to the fast principal birefringent axis of a connection optical fiber extending therefrom which is closely aligned with the polarizer blocking axis.

Polarizer 15, however, is not capable of entirely blocking electromagnetic waves in the one state of polarization that it is intended to block. This shortcoming in the extinction coefficient thereof leads to a non-reciprocity between two opposite direction traveling waves over the optical paths they follow as will be further described below, and so to a small non-reciprocal phase shift occurring between them which can vary with the conditions of the environment in which the polarizer and the remainder of the system is placed. In this regard, the high birefringence in the optical fibers used in the system again aids in reducing this resulting phase difference as indicated above.

Positioned against the port of polarizer 15 on the end opposite that connected to optical directional coupler 12 is polarization-maintaining optical fiber portion which extends to a further optical directional coupler, 17, a coupler which has the same transmission properties as does coupler 12. Again, if directional coupler 17 is formed by fusing together two optical fibers, the excess portion of one of the optical fibers therein past the coupling region therein may extend all the way to the appropriate port on one end of polarizer 15 so that, typically, the slow axis of that fiber is aligned with the pass axis of polarizer 15, although the alternative of having the fast axis so aligned is also possible. In another alternative, this excess portion may be spliced to an optical fiber portion extending from polarizer 15 with the principal birefringent axes in each of the optical fibers joined in the splice being closely aligned to one another. Typically, again the fast axis on one side of such a splice will be closely aligned to the fast axis on the other side, but not necessarily so as the fast axis on one side of the splice could alternatively be aligned to the slow axis on the other side.

The second port on the same end of coupler 17 from which the first port is coupled to polarizer 15 is connected in a non-reflective termination arrangement, 18, using a further optical fiber portion or the excess length of optical fiber associated with that port beyond the coupling region in coupler 17. One of the ports on the opposite end of coupler 17 is connected to a further optical component in the optical path portion extending thereto from one end of the optical fiber in coil 10. The other port in coupler 17 is directly coupled to the remaining end of optical fiber 10 which is typically accomplished through a splice between the excess length of an optical fiber past the coupling region in coupler 17 and the optical fiber in coil 10, again with the principal axes of each closely aligned with those in the other, typically with fast axis to fast axis but possibly with fast axis to slow axis.

Between coil 10 and coupler 17, on the side of coil 10 opposite the directly connected side thereof, there is provided an optical phase modulator, 19. Optical phase modulator 19 has a port on either end of the transmission media contained therein which occur in FIG. 1 at the opposite ends of that phase modulator. The optical fiber from coil 10 is positioned against a port of modulator 19, with the principal birefringent axes of the optical fiber being closely aligned with the principal birefringent axes of that modulator. The optical fiber extending from coupler 17 is positioned against the port on the opposite end of modulator 19 with the principal birefringent axes thereon again closely aligned with those of that modulator, again fast to fast being typical but possibly fast to slow.

Optical phase modulator 19 can be of the variety formed by wrapping an optical fiber portion around a piezoelectric cylinder so that the fiber may be stretched by the application of voltage to that cylinder, or this phase modulator may be formed as an optical integrated chip using a substrate of lithium niobate, for instance, with metallic depositions provided thereon and adjacent a waveguide provided therein. Such depositions typically result in plate-like structures on the substrate to both provide electrical contacts to the modulator and a means through which varying electrical fields can be established in the waveguide to result in the necessary modulation of the phase of electromagnetic waves passing through that waveguide.

Optical phase modulator 19 is thus capable of receiving electrical signals on these plates to cause the introduction of phase differences in electromagnetic waves transmitted therethrough by changing the index of refraction of the transmission medium, or transmission media, because of the resulting electric fields established therein to thereby change the effective optical path length experienced by such waves. Optical phase modulators constructed in optical integrated circuit form have a large bandwidth, i.e. are able to provide phase changes following a waveform that has substantial high frequency content. Note also that polarizer 15 and source and loop optical directional couplers 12 and 17 could also be formed in similar integrated optic chips, including possibly being formed in a common such chip.

Directional optical coupler 17 serves as a beam-splitting apparatus in that electromagnetic waves emitted from source 11 that are transmitted through coupler 12 and polarizer 15 to be received by coupler 17 are there split in approximately half with a corresponding one of the resulting portions passing out of each of the two ports on the opposite end of coupler 17. Out of one port on that opposite end of coupler 17, the corresponding electromagnetic wave portion passes through optical fiber coil 10, through optical phase modulator 19, and back to coupler 17. A portion of that electromagnetic wave passes through the port of coupler 17 leading to polarizer 15 and then to coupler 12 where a part of the remainder of the wave portion is transmitted to photodiode 13.

The other portion of the electromagnetic wave after the split in coupler 17 leaves that other port on the coil 10 end of coupler 17 to first pass through optical phase modulator 19, and then optical fiber coil 10 to re-enter coupler 17 and, again, from there follow the same path as the first portion previously described to finally impinge in part on photodiode 13. In the presence of modulation provided by phase modulator 19, and in the presence of any rotation of coil 10 about its axis, or because of effects in coupler 17, some of the energy of the combined waves will be lost through non-reflective arrangement 18.

As indicated above, photodiode 13 provides an output current proportional to the intensity of the combined electromagnetic waves, or light waves, impinging thereon adjusted for the phase difference therebetween, and this photocurrent follows a raised cosine function in being based on the cosine of the average phase difference between each wave over the wavelengths present therein at its impingement on that diode. This relationship follows because the photocurrent depends on the resulting optical intensity of the two waves incident on photodiode 13 which intensity will vary depending on how much constructive or destructive interference occurs between the two waves at the diode. This interference of waves will change with rotation of the coiled optical fiber forming coil 10 about its axis as such rotation introduces a phase difference shift between the waves because of the Sagnac effect. Further, additional phase difference shifts can be introduced by optical phase modulator 19 as will be described in connection with the electrical system shown in the remainder of FIG. 1.

The electrical system portion of FIG. 1 shows an open loop fiber optical gyroscope system, but could also be converted to a closed loop fiber optic gyroscopic system, i.e. using feedback on the system. This would be accomplished by having the electrical system provide a feedback signal based on the output of the system shown in FIG. 1 to control a further optical phase modulator inserted in the optical path next to modulator 19, or to additionally control modulator 19. Optical phase modulator 19 is of the kind described above and is used in conjunction with a phase sensitive demodulator, or phase detector, for converting the output signal of photodiode 13 and photodetector system 14, following a cosine function, to a signal following a sine function. Following such a sine function provides, in that output signal, information both as to rate of rotation and as to direction of that rotation about the axis of coil 10. Modulator 19 is operated by a sinusoidal signal provided at the output of a bias modulation signal generator, 20, which also provides this signal to operate a phase detector which, as indicated, is a phase sensitive demodulator.

Thus, the output signal from photodetector system 14, including photodiode 13, is provided to an amplifier, 21, where it is amplified and passed through a filter, 22, to a phase detector, 23. The phase sensitive demodulator serving as phase detector 23 is a well-known device. Such a phase sensitive demodulator senses changes in the first harmonic, or fundamental frequency, of signal generator 20 to provide an indication of the relative phase of the pair of electromagnetic waves impinging on photodetector 13. This information is presented by phase detector 23 in an output signal following a sine function, i.e. the sine of the phase difference between the two electromagnetic wave portions impinging on photodiode 13.

Bias modulation signal generator 22, in modulating the electromagnetic wave portions in the optical path at a frequency set by the output signal supplied thereby as described above, also generates a strong second harmonic component in photodetector system 14. Filter 22 is a notch filter for removing this second harmonic component.

In operation, the phase difference changes in the two opposite direction propagating electromagnetic waves passing through coil 10 in the optical paths therethrough will lead to average net phase difference changes which will be relatively small, and which will vary relatively slowly compared to the phase difference changes due to optical phase modulator 19 and bias modulation signal generator 20. Any phase difference shift due to the Sagnac effect will merely shift the average phase difference between the electromagnetic waves, and the output signal from phase sensitive demodulator 23, after photodiode signal demodulation therein, will depending on the sine of this phase difference multiplied by an amplitude scaling factor set by the modulation of the waves due to phase modulator 19 and signal generator 20. This synchronous demodulation thus substantially extracts from the photodiode output signal the amplitude of the sinusoidal modulation frequency component at the modulation frequency introduced by signal generator 20 and modulator 19, which includes the results of any rotation of coil 10 about its axis, to provide the demodulator output signal.

As indicated above, however, additional phase shifts between the counter-propagating electromagnetic waves can be introduced even with the fiber optic gyroscope system in a minimum reciprocal configuration by various effects occurring therein. A significant source of such non-reciprocal phase shifts not due to the Sagnac effect is the following of differing optical paths by the two different polarization components of the counter-propagating electromagnetic waves. Such coupling of one polarization component of such a wave to the path followed by the other component occurs primarily at the coupling regions in couplers 12 and 17, at the splices described above between optical fiber optic portions, and at those interfaces where optical fibers are positioned against an optical path component such as source 11, couplers 12 and 17, and polarizer 15. Coupling of the polarization components of a wave occurs at these splice and interface locations because there is always some rotational misalignment of the principal birefringent axes of the optical fibers at a splice, or where they are positioned against an optical component such as the emitting face of source 11, even though such axes are mated at such splices and interfaces in close alignment.

Of course, the coupling of polarization components of such electromagnetic waves in one polarization optical path to the other would not be a problem if polarizer 15 were a perfect polarizing component permitting complete wave transmission in the transmission axis thereof and no transmission in the blocking axis thereof. However, polarizers, including polarizer 15 as indicated above, are not perfect and so are characterized by an extinction ratio, representing the fraction of an incident electromagnetic wave on the polarizer in the blocking axis which is found in that same axis at the output of the polarizer. Since, as described above, there are a substantial number of coupling points due to splices and the like, there are a substantial number of opportunities for the polarization components in an electromagnetic wave to take different paths, and further, to be coupled again back to the path originally followed. This situation, coupled with the imperfect polarizer, can lead to errors at photodiode 13 since such coupling results in effective non-reciprocal phase shifts.

Such errors in the transmission of electromagnetic waves in the system of FIG. 1 can be represented based on using a reference point between source coupler 12 and polarizer 15 in FIG. 1 since nothing fundamentally new or different will be added to these errors by including source coupler 12 and source 11. This reference point will be represented as a "wavy" line in FIG. 1 at which outgoing and returning electromagnetic waves will be compared. The electromagnetic waves at this "wavy" line reference point will be represented as $E_x(t)$ and $E_y(t)$ for the components traveling along the principal birefringent axes of the optical fiber extending from this reference point to polarizer 15. The "x" designation, as indicated above, indicates the slow axis electromagnetic wave component and the "y" designation indicates the fast axis electromagnetic wave component.

The electromagnetic waves returning to the reference point after having left the reference point to traverse through coil 10 and the optical components therebetween can be written as follows:

$$\vec{\mathcal{E}}_{cw}(\nu) = G_{cw}(\nu) e^{+j\phi_r} \vec{\mathcal{E}}_i(\nu)$$

$$\vec{\mathcal{E}}_{ccw}(\nu) = G_{ccw}(\nu) e^{-j\phi_r} \vec{\mathcal{E}}_i(\nu)$$

where $\nu$ is the optical frequency. The vector $\vec{\mathcal{E}}_i(\nu)$ (designated as such through having an arrow over the top thereof) represents the electromagnetic waves leaving the reference plane to travel through coil 10 and return, and so is composed of just the two scalars $E_x(t)$ and $E_y(t)$ indicated above as occurring at the reference point but represented here by the Fourier transformation thereof, or $$\mathcal{E}_x(\nu) = \lim_{T \to \infty} \frac{1}{\sqrt{T}} \int_{-\frac{T}{2}}^{\frac{T}{2}} E_x(t) e^{j2\pi\nu t} dt$$

$$\mathcal{E}_y(\nu) = \lim_{T \to \infty} \frac{1}{\sqrt{T}} \int_{-\frac{T}{2}}^{\frac{T}{2}} E_y(t) e^{j2\pi\nu t} dt$$

where $$\vec{\mathcal{E}}_i(\nu) \begin{bmatrix} \mathcal{E}_x(\nu) \\ \mathcal{E}_y(\nu) \end{bmatrix}$$

The transfer matrices representing the effects of the polarization maintaining fiber, polarizer 15 and coupler 17, operating on the representation of the departing waves $\vec{\mathcal{E}}_i$ from the reference point, yields the returning wave vectors $\vec{\mathcal{E}}_{cw}(\nu)$ and $\vec{\mathcal{E}}_{cww}(\nu)$, can be written as follows:

$$G_{cw} = \begin{bmatrix} g_{xx}(\nu) & \epsilon g_{xy}(\nu) \\ \epsilon g_{yx}(\nu) & \epsilon^2 g_{yy}(\nu) \end{bmatrix} = G_{ccw}^T$$

The Sagnac phase shift is represented by $2\phi_r$.

As described above, the output signal provided by phase sensitive demodulator 23 depends on the total phase shift, $\Delta\phi$, occurring between the counter-propagating electromagnetic wave passing through coil 10 to reach photodetector 13. Thus, this output will depend essentially on the phase difference of the waves returning to the "wavy" line reference point which can be found from the argument of the complex matrix resulting from the product of the two waves, or $$\Delta\phi(\nu) = \arg[\vec{\mathcal{E}}_{ccw}^\dagger(\nu) \vec{\mathcal{E}}_{cw}(\nu)]$$

The "dagger" symbol $\dagger$ indicates that the Hermitian conjugate of the matrix is being used. This last equation can be rewritten using the equations above for $\vec{\mathcal{E}}_{cw}(\nu)$ and $\vec{\mathcal{E}}_{ccw}(\nu)$ and taking $\phi_r$ to be zero, i.e. no rotation of coil 10 about its axis perpendicular to the plane of the coil in FIG. 1, so only phase differences due to errors remain. Then, the phase differences, or path difference phase errors, $\Delta\phi_e$, due to polarization component path differences appear as:

$$\Delta\phi_e(\nu) = \arg[\vec{\mathcal{E}}_i^\dagger(\nu) G_{ccw}^\dagger G_{cw} \vec{\mathcal{E}}_i(\nu)]$$

Here again, the $\dagger$ indicates that the Hermitian conjugate of the matrix is being used. This last result is obtained at each optical frequency $\nu$, and so is the end result if a near monochromatic optical source is used for source 11. However, since source 11 is typically going to be a "broadband" optical source, the total error can be found only through integrating the last equation over the optical frequency although such a step is not made explicit here.

The off-diagonal elements of the transfer matrices $[G_{cw}]$ and $[G_{ccw}]$ in the system of FIG. 1 are much smaller in magnitude than the diagonal terms therein in a polarization maintaining optical fiber based gyroscope using a polarizer. Since these off diagonal terms in these matrices are small, the last equation can be shown to be approximately:

$$\Delta\phi_e \approx \Delta\phi_{ampl} + \Delta\phi_{inten}$$

where:

$$\Delta\phi_{Ampl}(\nu) \triangleq \frac{\epsilon Im\{g_{xx}^*(\nu)g_{xy}(\nu)\mathcal{E}_x^*(\nu)\mathcal{E}_y(\nu) + g_{xx}(\nu)g_{xy}^*(\nu)\mathcal{E}_x(\nu)\mathcal{E}_y^*(\nu)\}}{|g_{xx}(\nu)\mathcal{E}_x(\nu)|^2}$$

and $$\Delta\phi_{Inten}(\nu) \triangleq \frac{\epsilon^2 Im\{g_{xy}^*(\nu)g_{yx}(\nu)(|\mathcal{E}_x(\nu)|^2 |\mathcal{E}_y(\nu)|^2)\}}{|g_{xx}(\nu)\mathcal{E}_x(\nu)|^2}.$$

That is, the total phase error $\Delta\phi_e$ at any optical frequency $\nu$ can be separated into two parts, an amplitude related phase error, $\Delta\phi_{Ampl}$, and an intensity related phase error, $\Delta\phi_{Inten}$. The last two expressions show that amplitude related phase errors depend on the relative phases of the electromagnetic wave polarization components $\vec{\mathcal{E}}_x(\nu)$ and $\vec{\mathcal{E}}_y(\nu)$ and the first power of the polarization extinction coefficient, whereas the intensity related phase error depends on the differences in optical power in the two polarization component optical paths and the square of the polarizer extinction coefficient.

Elimination or significant reduction of such errors has been attempted in several ways. Relatively long sections of polarization maintaining optical fiber have been inserted in the optical path for this purpose, or a long section has been inserted followed by a polarization component intensity equalizer between source coupler 12 and polarizer 15. Birefrigence modulators have been inserted in the optical path.

Such measures can be expensive both in component costs and in assembly costs. Thus, there is a desire for a measure or measures to reduce or eliminate such errors at more moderate cost.

SUMMARY OF THE INVENTION

The present invention provides error reducing configurations for an optical fiber rotation sensor in which rotation information in the form of phase differences between a pair of substantially coherent electromagnetic waves entering from a polarizer to propagate in opposite directions through a birefringent optical fiber coil to thereafter impinge on a photodetector after exiting through the polarizer. These configurations have optical path lengths therein and birefringent axes relationships therein determined with respect to the autocorrelation of the source chosen for the system. As a result, both amplitude related and intensity related phase errors due to polarization mode coupling can be eliminated or reduced economically.

DETAILED DESCRIPTION OF THE PREFERRED EMBODIMENTS

The errors set forth in the foregoing equations are represented too abstractly to clearly demonstrate the nature thereof. To more fully see that nature, representative transfer matrix elements describing the optical paths must be used in these equations and a better representation of the relationship between source 11 and source coupler 12 must also be used. Further, the errors must be evaluated across the spectrum of source 11.

Turning to amplitude related phase errors first, the total amplitude phase error across the optical frequency spectrum of interest, $\Delta\phi_{AmplTot}$, determined primarily by the spectral width of the electromagnetic waves emitted by source 11, is the normalized value of the error $\Delta\phi_{Ampl}$ occurring at each such included optical frequency weighted by the average optical power inserted into the system at that frequency, or $$\Delta\phi_{AmplTot} = \frac{\int |g_{xx}(\nu)\mathscr{E}_x(\nu)|^2 \Delta\phi_{Ampl}(\nu) d\nu}{\int |g_{xx}(\nu)\mathscr{E}_x(\nu)|^2 d\nu}.$$

Figure 1:
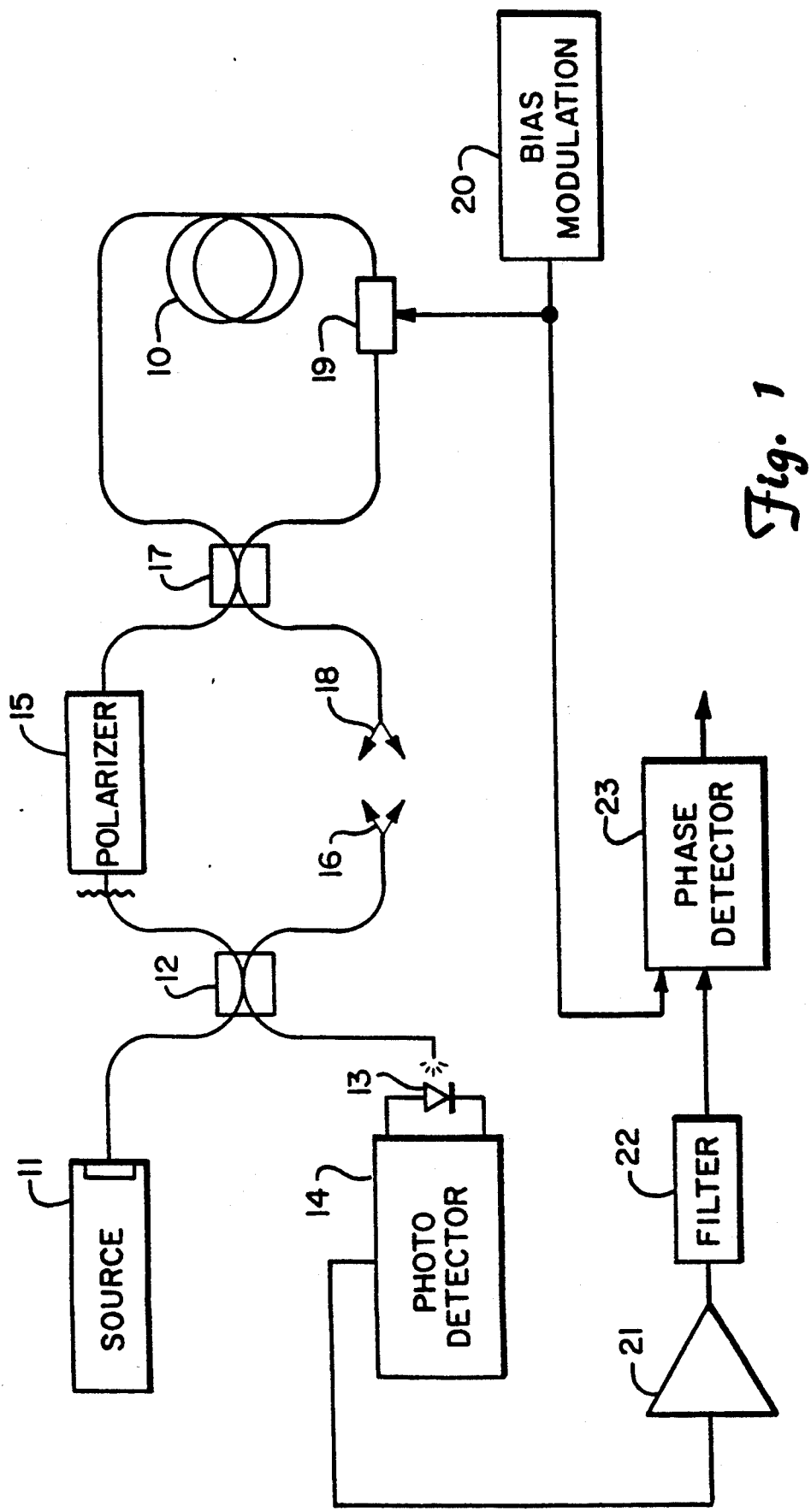
FIG. 1 shows a block diagram of a system known in the prior art.

Here, the optical power is indicated to be introduced along the "x" principle birefringent axis in accord with the description given above for the system shown in FIG. 1. Substituting for $\Delta\phi_{Ampl}$ from the equation defined therefor above yields:

$$\Delta\phi_{AmplTot} = \frac{\epsilon \int Im\{g_{xx}^*(\nu)g_{xy}(\nu)\mathscr{E}_x^*(\nu)\mathscr{E}_y(\nu) + g_{xx}(\nu)g_{yx}^*(\nu)\mathscr{E}_x(\nu)\mathscr{E}_y^*(\nu)\}d\nu}{\int |g_{xx}(\nu)\mathscr{E}_x(\nu)|^2 d\nu} =$$

$$\frac{\epsilon \int Im\{g_{xx}^*(\nu)g_{xy}(\nu)\mathscr{E}_x^*(\nu)\mathscr{E}_y(\nu) + g_{xx}(\nu)g_{yx}^*(\nu)\mathscr{E}_x(\nu)\mathscr{E}_y^*(\nu)\}d\nu}{\int |g_{xx}(\nu)\mathscr{E}_x(\nu)|^2 d\nu}$$

as the integral of the imaginary part of a complex variable over a real variable is equal to the imaginary part of the integral of that complex variable over the real variable.

Figure 2:
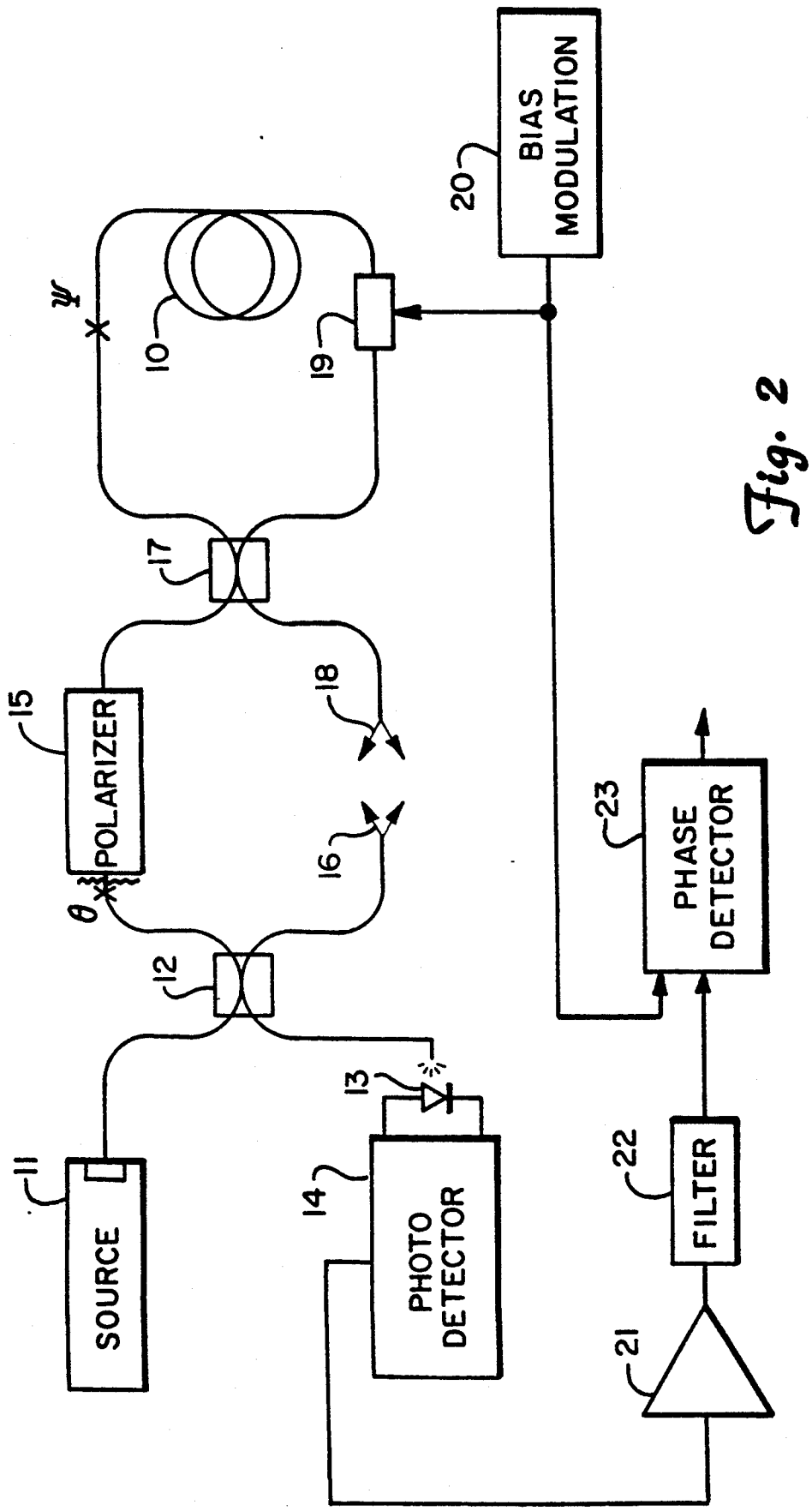
FIG. 2 shows a block diagram of a system known in the prior art.

The representation of source 11 and source coupler 12, and of the transfer matrix elements, needed to clarify the nature of this error, will be based on the system shown in FIG. 2 which is generally like the system of FIG. 1. There, in FIG. 2, is shown a pair of coupling points, one on either side of polarizer 15, which have been arbitrarily chosen in the optical paths of the electromagnetic waves traveling from source 11 through coil 10 and back to source coupler 12. Thus, assume that the excess optical fiber from source, or input, coupler 12 is spliced with an optical fiber portion extending from polarizer 15 someplace between those two components. At that location, the splice is assumed to have a rotational misalignment of a value $\theta$ between the principal birefringent axes in each of the optical fibers on either side of the splice which remains after attempting to closely align the fast axes of these fibers during the formation of the splice. Similarly, assume that coil 10 is spliced to the excess optical fiber leading from the upper port of loop coupler 17 at some location with a rotational misalignment of value $\psi$. FIG. 2 shows the system of FIG. 1 with these rotational misalignment points indicated by an "x" on the optical path representation at such locations, and with the corresponding rotational misalignment value written adjacent thereto.

The "wavy" line reference point for comparison of the outgoing and returning waves is chosen on the polarizer 15 side of the $\theta$ value rotational misalignment point just immediately to the right thereof in FIG. 2. This has been done since whatever alternate polarization path errors may arise in the system in the portion on the right cannot be changed by propagation to the left of this plane on the way to photodiode 13 by anything in the system between this plane and photodiode 13 since the returning waves are past polarizer 15.

The optical fiber positioned against laser diode 11 has its principal birefringence axes rotated to match a particular pair of axes of the source, these axes being the two axes therein along which electromagnetic waves are emitted such that the waves along one axis are uncorrelated with those waves emitted along the other.

Thus, the electromagnetic wave polarization component from source 11 introduced into the polarization component optical path along the one birefringent axis that is chosen to be given minimal effect in the desire to avoid errors in the sensing result, here the polarization component following the fast axis will, to the extent not blocked by polarizer 15, at least be uncorrelated with the waves introduced along the other polarization component optical path. Such a pair of source orthogonal axes can always be found, or selected, depending on the nature of the electromagnetic waves emitted. If the source emits electromagnetic waves which are entirely unpolarized, any pair of axes across the emitting face of the source will satisfy the requirement that the waves emitted along one axis not be correlated with those along the other simply from the definition of unpolarized electromagnetic waves. If, on the other hand, the electromagnetic waves are partially polarized, these waves, as is well known, can be represented by a pair of components one of which is a polarized component with the other being an unpolarized component. Thus, electromagnetic waves, emitted along that source face axis along which such a polarized component is emitted, will be uncorrelated with emitted electromagnetic waves following the orthogonal axis.

Typically, the symmetry of the geometrical configuration of the source will lead to the two axes along which these uncorrelated components are emitted being at right angles to one another, just as the principal birefringent axes are in the optical fiber to be butted thereagainst so these pairs of axes can be aligned with one another. The one of these source axes having the greater emission intensity will typically be aligned with the chosen primary propagation axis of the primary birefringent axes of the optical fiber positioned against the source, here the slow axis.

As a result of closely aligning the uncorrelated emission axes of the source and the principal birefringent axes of the optical fiber, a component of the electromagnetic waves, u(t), will be emitted from source 11 along one of its uncorrelated emission axes to propagate along one principal birefringent axis of the optical fiber extending therefrom. This component is written as a scalar without any geometric orientation parameter because of the definition thereof. Similarly, a second component of electromagnetic waves, v(t), again written as a scalar, will be emitted from source 11 along its other uncorrelated emission axis to propagate along the other principal birefringent axis of that optical fiber. Components u(t) and v(t), being uncorrelated, satisfy the relationship $$<u(t)v^*(t-\tau)> = 0$$

for all values of relative delay $\tau$, with v* indicating that the complex conjugate of v(t) is being used.

On the source, or left, side of the $\theta$ rotational misalignment, the electromagnetic waves along the principal birefringent axes of the optical fiber portion extending from coupler 12 can thus be written as qu(t) and qv(t). This follows because, after passing through coupler 12, only a fraction q of these electromagnetic waves reach the $\theta$ misalignment location because of the splitting of the waves by coupler 12 and propagation losses.

On the polarizer 15 side of the 8 rotational misalignment, or the right hand side of this misalignment in FIG. 2, the electromagnetic waves will again be represented as $E_x(t)$ and $E_y(t)$ for the components traveling along the principal birefringent axes of the optical fiber extending from the misalignment location to polarizer 15. The "x" designation indicates the slow axis which is here assumed perfectly aligned to the transmission axis of polarizer 15. Similarly, the symbol "y" indicates the fast axis electromagnetic wave component which is here assumed perfectly aligned with the blocking axis of polarizer 15. These alignment assumptions are made since only the results of polarization components changing optical paths at the $\theta$ and $\psi$ rotation misalignment locations are going to be considered initially. As a result, the relationship between the electromagnetic wave polarization components on either side of the $\theta$ rotational misalignment ignoring the delay between u(t) and v(t) (since they are uncorrelated) can be written in matrix form as follows:

$$\begin{bmatrix} E_x(t) \\ E_y(t) \end{bmatrix} = \begin{bmatrix} \cos\theta & \sin\theta \\ -\sin\theta & \cos\theta \end{bmatrix} \begin{bmatrix} qu(t) \\ qv(t) \end{bmatrix}$$

Evaluating the expression for the total amplitude phase error $\Delta\phi_{AmplTot}$ requires supplying expressions for the transfer matrix elements $g_{xx}$, $g_{xy}$ and $g_{yx}$. These expressions will assume that essentially the only effects of traveling from the reference plane through coil 10 and back are delays necessary to travel over the polarization component optical paths traversed by electromagnetic waves leaving the reference point to pass through coil 10 and return thereto, the coupling between polarization component optical paths occurring because of rotational misalignment $\psi$, the differing of indices of refraction in the various polarization component optical paths, and the lumped effects of coupler 17 and various fixed losses therein and in the optical fibers in the optical paths. The effects of polarizer 15 are already incorporated in the last expression for this error as represented by the extinction coefficient, and so will not be further considered here other than to the extent that they may add to the length of the optical paths taken.

Finally, the bias modulation in the optical paths introduced by optical phase modulator 19 will be ignored in these expressions, and so the only contribution thereto will be the added length in the optical paths due to the presence of modulator 19. The effects of modulator 19 are to introduce a time dependence into the equations in addition to the frequency dependence already indicated, an added complexity which would greatly complicate the valuation of the last error expression. Further, the time dependence as introduced by optical phase modulator 19 has been shown not to effect the results obtained in evaluating the last error expression, although the magnitude of the phase errors can in some situations be driven to zero by choosing an appropriate operational sequence for optical phase modulator 19. Thus, the phase error found can be essentially affected in amplitude but not in form by the operation of phase modulator 19 which has been found to be an unsatisfactory way of eliminating such phase errors.

Accepting such limitations, the following expressions for $g_{xx}$, $g_{xy}$ and $g_{yx}$ will be used where the length L represents the distance from the "wavy" line reference point to the $\psi$ rotational misalignment point through coil 10, and the distance 1 represents the distance between the "wavy" line reference point and the $\psi$ rotational misalignment point when the optical path therebetween does not include coil 10:

$$g_{xx} = p_1 e^{-j2\pi\nu\left[\frac{l}{c} n_x(\nu) + \frac{L}{c} n_x(\nu)\right]}\cos\psi$$

$$g_{xy} = p_1 e^{-j2\pi\nu\left[\frac{l}{c} n_x(\nu) + \frac{L}{c} n_y(\nu)\right]}\sin\psi$$

$$g_{yx} = p_1 e^{-j2\pi\nu\left[\frac{l}{c} n_y(\nu) + \frac{L}{c} n_x(\nu)\right]}(-\sin\psi)$$

In these expressions, a constant, $p_1$, represents the splitting of the electromagnetic waves entering coupler 17 to form counter-rotating waves in coil 10, and includes the losses in coupler 17 and the losses in the optical fiber. The same weighting constant is used for each of these last three expressions since the differential losses which arise because of differences in the polarization component optical paths are negligible for present purposes. The variable $n_x(\nu)$ represents the index of refraction along the "x" primary polarization propagation optical path, i.e. the slow axes of the optical fibers in FIG. 2 to the right of the "wavy" line reference point and the transmission path of polarizer 15, and the variable $n_y(\nu)$ represents the index of refraction along the "y" primary polarization propagation optical path including the fast axes of those optical fibers and the blocking axis of polarizer 15. The constant c in the above expressions represents, as usual, the speed of light in a vacuum.

Thus, the transfer matrix elements are represented by a wave splitting fraction multiplying corresponding scalar wave exponential propagation phase functions having propagation expressions in the arguments thereof depending on the optical paths followed corresponding to that element. Again, because of the known propagation along polarization component optical paths, a scalar representation is sufficient allowing suppression of other geometrical parameters. A further multiplying factor is a corresponding trigonometric function of $\psi$ rotational misalignment point corresponding to that element in view of its associated optical path as delineated in the argument of its exponential.

The dependence of the indices of refraction $n_x(\nu)$ and $n_y(\nu)$ upon the optical frequency $\nu$ indicates that dispersive media may be encountered along the optical paths followed by the electromagnetic waves in FIG. 2. Such dispersion will cause electromagnetic wave components at different frequencies to have differing delays along the optical paths followed thereby. Thus, if $n_x(\nu)=$const. and $n_y(\nu)=$const., exponential terms in the last three expressions containing such indices in the exponents thereof will have constant exponents which can be rewritten to contain corresponding fixed time delays. As examples, $$e^{-j2\pi\nu\frac{l}{c}n_{xconst.}} = e^{-j2\pi\nu\tau_{lxc}}\ ; \ \tau_{lxc} \triangleq \frac{l}{c} n_{xconst.}$$

$$e^{-j2\pi\nu\frac{L}{c}n_{yconst.}} = e^{-j2\pi\nu\tau_{Lyc}}\ ; \ \tau_{Lyc} \triangleq \frac{L}{c} n_{yconst.}$$

The fixed time delays $\tau_{lxc}$ and $\tau_{Lyc}$ represent the fixed and common propagation delays of each optical frequency in the electromagnetic waves over corresponding portions of the polarization component optical paths.

However, if dispersion is present and significant to first order, these indices of refraction must be written as:

$$n_x(\nu) \approx n_{xo} + \nu \frac{dn_x(\nu)}{d\nu}$$

$$n_y(\nu) \approx n_{yo} + \nu \frac{dn_y(\nu)}{d\nu}$$

Repeating the examples above yields:

$$e^{-j2\pi\nu\frac{l}{c}\left[n_{xo}+\nu\frac{dn_x(\nu)}{d\nu}\right]} \approx e^{-j2\pi\nu\frac{l}{c}\left[n_x(\bar\nu)+\bar\nu\frac{dn_x(\nu)}{d\nu}\big|_{\bar\nu}\right]}$$
$$= e^{-j2\pi\nu\frac{l}{c}\left(\frac{d[\nu n_x(\nu)]}{d\nu}\right)}$$
$$= e^{-j2\pi\nu\tau_{lxg}}$$

where $$\tau_{lxg} \triangleq \frac{l}{c}\left(\frac{d[\nu n_x(\nu)]}{d\nu}\right),$$

and $$e^{-j2\pi\nu\frac{L}{c}\left[n_{yo}+\nu\frac{dn_y(\nu)}{d\nu}\right]} \approx e^{-j2\pi\nu\frac{L}{c}\left[n_y(\bar\nu)+\bar\nu\frac{dn_y(\nu)}{d\nu}\big|_{\bar\nu}\right]}$$
$$= e^{-j2\pi\nu\frac{L}{c}\left(\frac{d[\nu n_y(\nu)]}{d\nu}\right)}$$
$$= e^{-j2\pi\nu\tau_{Lyg}}$$

where $$\tau_{Lyg} \triangleq \frac{L}{c}\left(\frac{d[\nu n_y(\nu)]}{d\nu}\right)$$

Here, the delays $\tau_{lxg}$ and $\tau_{Lyg}$ represent fixed group delays corresponding to the times it would take an electromagnetic wave pulse to travel over the corresponding polarization component optical path lengths. A bar symbol over a variable or a function indicates that an average value of that variable or function is intended.

A further possibility is that second order dispersion effects would also be significant. Such a situation can arise with the use of an integrated optic chip such as one having a substrate formed of lithium niobate, $LiNbO_3$, a situation, as previously indicated, which could occur in the structure of optical phase modulator 19. Lithium niobate has a significant second order effect at wavelengths around 0.8 μm which would typically be included in the spectral width of source 11. In these circumstances, the indices of refraction are written as:

$$n_x(\nu) \approx n_{xo} + \nu\frac{dn_x(\nu)}{d\nu} + \frac{1}{2}\nu^2\frac{d^2n_x(\nu)}{d\nu^2}$$

$$n_y(\nu) \approx n_{yo} + \nu\frac{dn_y(\nu)}{d\nu} + \frac{1}{2}\nu^2\frac{d^2n_y(\nu)}{d\nu^2}$$

Such effects cause added complications and result in having to consider several different group delays for each of several portions of the emission spectrum for source 11 giving rise to what is often termed group delay dispersion, a situation which will be further described below.

In view of the foregoing, the expressions for the transfer matrix elements can be rewritten as follows:

$$g_{xx} = p_1 e^{-j2\pi\nu(\tau_{lx}+\tau_{Lx})}\sin\psi$$

$$g_{xy} = p_1 e^{-j2\pi\nu(\tau_{lx}+\tau_{Ly})}\sin\psi$$

$$g_{yx} = p_1 e^{-j2\pi\nu(\tau_{ly}+\tau_{Lx})}(-\sin\psi)$$

In these last expressions, the delays fix, $\tau_{lx}$, $\tau_{Lx}$, $\tau_{ly}$ and $\tau_{Ly}$ represent fixed group delays generally, although they also represent fixed delays in the absence of dispersion, though this latter situation is unlikely to occur as dispersion is commonly present in optical fibers. In any event, the possibility of group delay dispersion is not explicitly provided for in these last expressions.

These transfer matrix elements are then to be used in evaluating the previous expression for $\Delta\phi_{AmplTot}$ found above. Breaking that expression up according to its numerator terms and its denominator for purposes of evaluation provides the following result:

$$\Delta\phi_{AmplTot} = \frac{\epsilon Im(\Delta\phi_{AmplTot-fn} + \Delta\phi_{AmplTot-sn})}{\Delta\phi_{AmplTot-d}}$$

where $$\Delta\phi_{AmplTot-fn} = \int g_{xx}^*(\nu)g_{xy}(\nu)\mathscr{E}_x^*(\nu)\mathscr{E}_y(\nu)d\nu$$
$$\Delta\phi_{AmplTot-sn} = \int g_{xx}(\nu)g_{yx}(\nu)\mathscr{E}_x^*(\nu)\mathscr{E}_y(\nu)d\nu$$
$$\Delta\phi_{AmplTot-d} = \int |g_{xx}(\nu)\mathscr{E}_x(\nu)|\, d\nu$$

The first of the numerator terms, $\Delta\phi_{AmplTot-fn}$, can be written with the transfer matrix elements inserted therein as:

$$\Delta\phi_{AmplTot-fn} = p_1^2 \int [e^{+j2\pi\nu(\tau_{lx}+\tau_{Lx})}\cos\psi][e^{-j2\pi\nu(\tau_{lx}+\tau_{Ly})}\sin\psi] \times$$

$$\mathscr{E}_x^*(\nu)\mathscr{E}_y(\nu)d\nu = p_1^2\sin\psi\cos\psi \int \mathscr{E}_x^*(\nu)\mathscr{E}_y(\nu)e^{-j2\pi\nu(\tau_{Ly}-\tau_{Lx})}d\nu$$

Substituting in this last expression the Fourier transforms of $E_x(t)$, yielding $\mathscr{E}_x(\nu)$ and of $E_y(t)$, yielding $\mathscr{E}_y(\nu)$, respectively, as given above provides the result:

$$\Delta\phi_{AmplTot-fn} =$$

$$\lim_{T\to\infty} p_1^2\sin\psi\cos\psi \frac{1}{T} \int_\nu \int_{-\frac{T}{2}}^{\frac{T}{2}} \int_{-\frac{T}{2}}^{\frac{T}{2}} E_x^*(t)E_y(t') \times$$

$$e^{-j2\pi\nu(t-t'+\tau_{Ly}-\tau_{Lx})}d\nu dt dt'$$

after interchanging the order of integration. From the theory of generalized functions the integral over the optical frequency $\nu$ in the last expression yields the Dirac delta function, or $$\int_\nu e^{-j2\pi\nu(t-t'+\tau_{Ly}-\tau_{Lx})}d\nu = \delta(t - t' + \tau_{Ly} - \tau_{Lx}).$$

Thus, performing the integral over the optical frequency in the expression for $\Delta\phi_{AmplTot-fn}$ results in the following expression:

$$\Delta\phi_{AmplTot-fn} =$$

$$\lim_{T\to\infty} p_1^2\sin\psi\cos\psi \frac{1}{T} \int_{-\frac{T}{2}}^{\frac{T}{2}} \int_{-\frac{T}{2}}^{\frac{T}{2}} E_x^*(t)E_y(t') \times$$

$$\delta(t - t' + \Delta\tau_L)dt dt'$$

where $$\Delta\tau_L \triangleq \tau_{Ly} - \tau_{Lx}.$$

which is the difference in propagation delays between the "wavy" line references point and the $\psi$ rotation misalignment point over the two polarization component optical paths therebetween through coil 10, with the delays being either fixed delays or being fixed group delays.

Again, from generalized function theory, the Dirac delta function provides a "sifting" effect on the remaining integrals to give the result:

$$\Delta\phi_{AmplTot-fn} =$$

$$\lim_{T\to\infty} p_1^2\sin\psi\cos\psi \frac{1}{T} \int_{-\frac{T}{2}}^{\frac{T}{2}} E_x^*(t)E_y(t + \Delta\tau_L)dt$$

The integral in this last expression is directly related to the time average value of the product of the two electromagnetic wave polarization components, that is:

$$\lim_{T\to\infty} \frac{1}{T} \int_{-\frac{T}{2}}^{\frac{T}{2}} E_x^*(t)E_y(t + \Delta\tau_L)dt = \langle E_x^*(t)E_y(t + \Delta\tau_L)\rangle$$

Substituting this time average expression in the last expression for the first numerator term of the amplitude total phase error yields:

$$\Delta\phi_{AmplTot-fn} = p_1^2 \sin\psi \cos\psi \langle E_x^*(t)E_y(t+\Delta\tau_L)\rangle$$

Note that this time average of the product of the two electromagnetic wave polarization components is the time average of the two components, but with one of these components substantially delayed with respect to the other, the amount of delay being equal to the difference in delay of these two components from the $\psi$ misalignment point through coil 10 to the "wavy" line reference. Because of the substantial length of coil 10, difference in delay, $\Delta\tau_L$, will be relatively large, and in fact will be considerably longer than the coherence time of the electromagnetic waves emitted by source 11. As a result, these two polarization components will be uncorrelated in the above time average thus resulting in a value of zero for that average. Hence, the amplitude phase error contribution from the first term in the numerator will be zero, or $\Delta\phi_{AmplTot-fn}=0$.

The second numerator term contribution to the amplitude total phase error, $\Delta\phi_{AmplTot-sn}$, with the transfer matrix components therein having the values for those components substituted yields the following:

$$\Delta\phi_{AmplTot-sn} = -p_1^2 \int e^{-j2\pi\nu(\tau_{lx}+\tau_{Lx})}\cos\psi \times$$
$$e^{+j2\pi\nu(\tau_{ly}+\tau_{Lx})}\sin\psi \mathscr{E}_x^*(\nu)\mathscr{E}_y^*(\nu)d\nu$$
$$= -p_1^2\sin\psi\cos\psi \int \mathscr{E}_x(\nu)\mathscr{E}_y^*(\nu)e^{-j2\pi\nu(\tau_{lx}-\tau_{ly})}d\nu$$

Again, using the Fourier transformation relation given above transforming $E_x(t)$ to $\mathscr{E}_x(\nu)$ and $E_y(t)$ to $\mathscr{E}_y(\nu)$, the last relationship can be written:

$$\Delta\phi_{AmplTot-sn} =$$

$$-p_1^2 \sin\psi\cos\psi \lim_{T\to\infty} \frac{1}{T} \int_\nu \int_{-\frac{T}{2}}^{\frac{T}{2}} \int_{-\frac{T}{2}}^{\frac{T}{2}} E_x(t)E_y^*(t') \times$$

$$e^{-j2\pi\nu(t'-t+\Delta\tau_1)} d\nu dt dt'$$

where $$\Delta\tau_1 \triangleq \tau_{lx} - \tau_{ly}$$

which is the difference in propagation delays between the "wavy" line reference point and the $\psi$ rotation misalignment point over the two polarization component optical paths therebetween not passing through coil 10 with the delays again being either fixed delays or being fixed group delays.

Using the expression above for the Dirac delta function from generalized function theory and integrating over the optical frequency $\nu$ after interchanging the order of integration results in the following:

$$\Delta\phi_{AmplTot-sn} =$$

$$-p_1^2 \sin\psi\cos\psi \lim_{T\to\infty} \frac{1}{T} \int_{-\frac{T}{2}}^{\frac{T}{2}} \int_{-\frac{T}{2}}^{\frac{T}{2}} E_x(t)E_y^*(t') \times$$

$$\delta(t' - t + \Delta\tau_1) dt dt'$$

Integrating over time, the "sifting" action of the delta function yields:

$$\Delta\phi_{AmplTot-sn} =$$

$$-p_1^2 \sin\psi\cos\psi \lim_{T\to\infty} \frac{1}{T} \int_{-\frac{T}{2}}^{\frac{T}{2}} E_x(t)E_y^*(t - \Delta\tau_1) dt$$

Again, this integral is related to the time average of the product of the two electromagnetic wave polarization components, and so this last expression can be rewritten as:

$$\Delta\phi_{AmplTot-sn} = -p_1^2 \sin\psi \cos\psi <(E_x(t)E_y^*(t-\Delta\tau_1))>$$

Here, the time average of the two electromagnetic wave polarization components again represents the time average of the components with one delayed with respect to the other, the amount of the delay being the difference in the propagation times from the $\psi$ rotational misalignment to the "wavy" line reference but without passing through coil 10. In this situation, the time average will not necessarily have a value of zero.

However, the above procedure cannot be used in the presence of significant second order dispersion, or group delay dispersion, i.e. where $$\frac{d^2 n(\nu)}{d\nu^2}$$

is significant. In these circumstances, the relationship giving the Dirac delta function from generalized function theory cannot be properly invoked where the delay times in the exponent in the exponential term under the integral are a function of the optical frequency $\nu$. The integration over the optical frequency $\nu$ in the triple integrals above will yield a relatively sharply peaked function, certainly, but not so sharp as a Dirac delta function. This resulting broadened peak function, i.e. the effect of such dispersion, will effectively increase the relative polarization component delay difference terms $\Delta\tau_L$ and $\Delta\tau_l$. Such a result will have no significant effect in connection with the first numerator term contribution to the total amplitude phase error because the long delay time through coil 10 will still result in a zero value average. However, such a result will change the second numerator term contribution from that given in the last expression.

In such a situation, the emitted radiation from source 11 leaving the "wavy" line reference point, $\mathscr{E}_x(\nu)$ and $\mathscr{E}_y(\nu)$, must be separated into optical frequency bands sufficiently narrow so that the group delay dispersion becomes negligible within each such band, or $$\mathscr{E}_x(\nu) \triangleq \sum_i \mathscr{E}_{xi}(\nu), \mathscr{E}_y(\nu) \triangleq \sum_i \mathscr{E}_{yi}(\nu).$$

Then, the second numerator term for total amplitude phase error $\Delta\phi_{AmplTot-sn}$ can be written:

$$\Delta\phi_{AmplTot-sn} =$$

$$-p_1^2 \sin\psi\cos\psi \sum_i \int e^{-j2\pi\nu\Delta\tau_{li}} \mathscr{E}_{xi}(\nu) \mathscr{E}_{yi}^*(\nu) d\nu$$

where $\Delta\tau_{li}$ is the difference in the fixed group delays between the polarization component optical paths in the i th frequency band of the source spectrum.

At this point, the procedure follows much as before. A substitution of Fourier transformation for the electromagnetic waves in each frequency band gives:

$$\Delta\phi_{AmplTot-sn} =$$

$$-p_1^2 \sin\psi\cos\psi \sum_i \lim_{T\to\infty} \frac{1}{T} \int_\nu \int_{-\frac{T}{2}}^{\frac{T}{2}} \int_{-\frac{T}{2}}^{\frac{T}{2}} E_{xi}(t)E_{yi}^*(t') \times$$

$$e^{-j2\pi\nu(t'-t+\Delta\tau_{li})} d\nu dt dt'$$

after interchanging the order of integration with $$\mathscr{E}_{xi}(\nu) = \lim_{T\to\infty} \frac{1}{\sqrt{T}} \int_{-\frac{T}{2}}^{\frac{T}{2}} E_{xi}(t) e^{j2\pi\nu t} dt$$

$$\mathscr{E}_{yi}(\nu) = \lim_{T\to\infty} \frac{1}{\sqrt{T}} \int_{-\frac{T}{2}}^{\frac{T}{2}} E_{yi}(t) e^{j2\pi\nu t} dt$$

Then, in each optical frequency band the Dirac delta function can be used to yield:

$$\Delta\phi_{AmplTot-sn} =$$

$$-p_1^2\sin\psi\cos\psi \sum_i \lim_{T\to\infty} \frac{1}{T} \int_v \int_{-\frac{T}{2}}^{\frac{T}{2}} \int_{-\frac{T}{2}}^{\frac{T}{2}} E_{xi}(t)E_{yi}^*(t') \times$$

$$\delta(t'-t+\Delta\tau_{1i})dt dt'$$

The shifting property then results in:

$$\Delta\phi_{AmplTot-sn} =$$

$$-p_1^2\sin\psi\cos\psi \sum_i \lim_{T\to\infty} \frac{1}{T} \int_{-\frac{T}{2}}^{\frac{T}{2}} E_{xi}(t)E_{yi}^*(t-\Delta\tau_{1i})dt$$

or, using the definition of the time average given above, the following result is reached:

$$\Delta\phi_{AmplTot-sn} = -p_1^2\sin\psi\cos\psi \sum_i <E_{xi}(t)E_{yi}^*(t-\Delta\tau_{1i})>$$

Thus, where the previous result for $\Delta\phi_{AmplTot-sn}$ depends on a single time average in the situations of either fixed delays in the absence of dispersion effects, or fixed group delays in the situation where just first order dispersion is significant [$dn(\nu)/d\nu$ significant], the situation involving group delay dispersion differs. In this group delay situation, or where second order dispersion is significant [$d^2n(\nu)/d\nu^2$ significant], the result for $\Delta\phi_{AmplTot-sn}$ depends on a sum of time averages rather than on a single time average as in the previous expression for $\Delta\phi_{AmplTot-sn}$ obtained ignoring second order dispersion to effectively give the broadening indicated above.

Group delay dispersion will have no effect on the denominator contribution to the amplitude total phase error, as will be shown below, as the effect of the transfer matrix element in the denominator is cancelled by the squaring operation appearing therein. This can be seen by evaluating the denominator contribution term after inserting the transfer matrix element value therein, or $$\Delta\phi_{AmplTot-d} = p_1^2 \int |e^{-j2\pi\nu(\tau lx+\tau Lx)}\cos\psi \, \mathbf{F}_x(\nu)|^2 d\nu$$

$$= P_1^2 \int \cos^2\psi |\mathbf{F}_x(\nu)|^2 d\nu$$

This last result can be written in the time domain by use of Parseval's theorem from Fourier transform theory, also recognizing that the resulting integral is the time average of the square of the polarization component involved, or $$\Delta\phi_{AmplTot-d} = p_1^2 \cos^2\psi <|E_x(t)|^2>$$

Thus, the amplitude total phase error in the absence of group delay dispersion can be written as follows filling in the terms found above:

$$\Delta\phi_{AmplTot} = \frac{\epsilon Im(\Delta\phi_{AmplTot-fn} + \Delta\phi_{AmplTot-sn})}{\Delta\phi_{AmplTot-d}}$$

$$= -\epsilon\tan\psi \frac{Im<E_x(t)E_y^*(t-\Delta\tau_1)>}{<|E_x(t)|^2>}$$

The absolute value of this expression will be the maximum value of the total amplitude phase error, $\Delta\phi_{AmplTot-max}$, and results in the following:

$$\Delta\phi_{AmplTot-max} = \epsilon \frac{|\tan\psi <E_x(t)E_y^*(t-\Delta\tau_L)>|}{<|E_x(t)|^2>}$$

This last expression then is the amplitude phase error at the "wavy" line reference in the absence of group delay dispersion for electromagnetic waves propagating from the "wavy" line reference through coil 10 and back. The effect of any group delay dispersion will lead to a summation of time averages in the numerator of this expression as shown above.

However, to complete finding the total amplitude phase error for the system as it occurs at the "wavy" reference line, the electromagnetic waves emitted from source 11, passing through coupler 12 and the $\theta$ rotational misalignment, must be introduced into this last expression. This is accomplished through using the individual equations implied in the matrix equation above relating $E_x(t)$ and $E_y(t)$ to $u(t)$ and $v(t)$. Thus, the time average of the polarization components in the last expression can be rewritten using those relationships from that matrix equation as:

$$<E_x(t)E_y^*(t-\Delta\tau_1)> = <[qu(t)\cos\theta + qv(t)\sin\theta] \times$$

$$[-qu^*(t-\Delta\tau_1)\sin\theta + qv^*(t-\Delta\tau_1)\cos\theta]> =$$

$$-q^2<u(t)u^*(t-\Delta\tau_1)>\sin\theta\cos\theta +$$

$$q^2<v(t)v^*(t-\Delta\tau_1)>\sin\theta\cos\theta -$$

$$q^2<v(t)u^*(t-\Delta\tau_1)>\sin^2\theta + q^2<u(t)v^*(t-\Delta\tau_1)>\cos^2\theta$$

Because the two emitted electromagnetic waves are uncorrelated, the time averages in the last expression involving the product of emission components $v(t)$ and $u(t)$ equal zero, giving the result:

$$<E_x(t)E_y^*(t-\Delta\tau_1)> = q^2 \sin\theta\cos\theta[<v(t)v^*(t-\Delta\tau_1)> - <u(t)u^*(t-\Delta\tau_1)>]$$

The two time averages remaining in this last expression each represent the self-coherence function, or the time-based autocorrelation function, of the corresponding emission component of the electromagnetic waves emitted by source 11. If these self-coherence, or autocorrelation, functions are normalized by dividing each by the corresponding optical power, the result is the complex degree of coherence for each of these emission components, $\gamma_u(\Delta\tau_1)$ and $\gamma_v(\Delta\tau_1)$, or $$\gamma_u(\Delta\tau_1) \triangleq \frac{<u(t)u^*(t-\Delta\tau_1)>}{P_u};$$

$$\gamma_v(\Delta\tau_1) \triangleq \frac{<v(t)v^*(t-\Delta\tau_1)>}{P_v} \text{ where }$$

$$P_u \triangleq <|u(t)|^2>; P_v \triangleq <|v(t)|^2>,$$

that is, $P_u$ and $P_v$ are the optical powers of the u and v emission components. Thus, the time average of the polarization components in the numerator of the expression for $\Delta\phi_{AmplTot-max}$ can be written as:

$$<E_x(t)E_y^*(t-\Delta\tau_1)> = q^2 \sin\theta\cos\theta[P_v\gamma_v(\Delta\tau_1) - P_u\gamma_u(\Delta\tau_1)]$$

This last expression can be further simplified if, as is typical, each emission component has the same optical spectra because then the complex degree of coherence for each will be equal to that of the other, or $$\gamma_u(\Delta\tau_j) = \gamma_v(\Delta\tau_j) \triangleq \gamma(\Delta\tau_j)$$

This results in the previous expression being simplified to:

$$<E_x(t)E^*_y(-\Delta\tau_j)> = -q^2 \sin\theta\cos\theta\gamma(\Delta\tau_j)[P_v - P_u]$$

Hence, this time average is determined in part by the value of the complex degree of coherence of the electromagnetic waves emitted by source 11 at the specific time delay $\Delta\tau_j$.

The denominator in the expression for the maximum of the total amplitude phase error is found making this same sort of substitution from the equations involved in the matrix relating the polarization components to the emission components above with the result:

$$\begin{aligned}<|E_x(t)|^2> &= <|qu(t)\cos\theta + qv(t)\sin\theta|^2> \\ &= <q^2|u(t)|^2>\cos^2\theta + <q^2|v(t)|^2>\sin^2\theta \\ &= q^2 P_u\cos^2\theta + q^2 P_v\sin^2\theta,\end{aligned}$$

noting that the time averages of the products of the u(t) and v(t) emission components are again zero since they are uncorrelated.

Thus, the maximum of the total amplitude phase error $\Delta\phi_{AmplTot-max}$ can now be written, this expression being:

$$\Delta\phi_{AmplTot-max} = \epsilon \left| \tan\psi\gamma(\Delta\tau_1) \frac{\sin\theta\cos\theta(P_u - P_v)}{P_u\cos^2\theta + P_v\sin^2\theta} \right|$$

Because the rotational alignments will be slight where the principal axes of birefringence on either side of the splice at the rotational misalignment points are attempted to be closely aligned with one another, the angles $\theta$ and $\psi$ will also be quite small with the result $$\sin\theta \approx \theta \triangleq k_1; \cos\theta \approx 1; \tan\psi \approx \psi \triangleq k_2$$

Substituting these results into the previous expression gives the final expression for the maximum value of the total amplitude phase error, or $$\Delta\phi_{AmplTot-max} = \epsilon \left| k_1 k_2 \gamma(\Delta\tau_1) \frac{P_u - P_v}{P_u} \right|.$$

This last expression represents the maximum total amplitude phase error for two rotational misalignments of the system of FIG. 2. However, as previously described, there will be a number of splices on either side of polarizer 15 in FIG. 2 with each pair of such splices having one member on either side of polarizer 15 giving rise to a phase error expression like the last. However, the error of each pair will not always be this maximum, and they will combine additively. As a result, the total phase error due to all splices and other coupling locations, $\Delta\phi_{AmplTot-as}$, which is cumulative, can be written:

$$\Delta\phi_{AmplTot-as} = \epsilon \sum_{ij} \left( \frac{P_u - P_v}{P_u} \right)_i k_i k_j Im[\gamma(\Delta\tau_{1\theta_i\psi_j})]$$

Here, the subscript i refers to the $i^{th}$ coupling point on the source side of polarizer 15, and the subscript j refers to the $j^{th}$ coupling point in loop 10, i.e. the coupling points to the right of coupler 17 in FIG. 2.

Thus, this amplitude phase error comes about from electromagnetic waves coupling between the orthogonal polarization axes before entering polarizer 15, and then coupling again between the axes to the right of coupler 17. Any such pair of points on opposite sides of polarizer 15, in effect, results in forming a parasitic interferometer at photodetector 13, which contributes to bias drift. More generally, amplitude related phase error comes about because of electric field components of the wave that were polarized in different polarization modes just before entering coupler 17 being brought into the same polarization mode by a coupling location in or to the right of coupler 17 (or an odd number of such coupling locations) to coherently interfere.

Note though, the previous expression ignores the possibilities of a further pair of recouplings from one polarization component optical path to another in and to the right of coupler 17 after an earlier pair of couplings on opposite sides of polarizer 15 because of the presence of multiple splices or other coupling locations. Such multiple splices would complicate the form of the elements chosen for the transfer matrix, but these complications can in any event be ignored since the coupling fraction at any splice is so small due to the attempt to provide close alignment between the principal birefringent axis on either side of the splice. Such small coupling fractions lead to the first pair of couplings coupling a relatively small amount in an electromagnetic wave polarization component, and a recoupling would lead to a small fraction of that first small fraction, and so the very small result can be ignored.

This last expression also represents the situation of no dispersion or, if there is dispersion, only first order dispersion with the $\Delta\tau$'s being fixed group delays. The presence of group delay dispersion will result in a summation over the optical frequency bands defined above in accommodating such dispersion in the corresponding complex degrees of coherence.

Before considering circumventing the errors represented in this last expression, the general nature of the complex degree of coherence of source 11, $\gamma(T)$ or $\gamma_k(T)$ for the key frequency band if group delay dispersion is present, must be determined. While this will typically be done by measurement of the source autocorrelation function, the general nature of the measurement outcome can be easily found.

In a laser diode as is typically used for source 11 in the system of the present invention, electromagnetic waves or light E(t) are spontaneously emitted in the interior thereof upon establishing a current therethrough. Some of these waves will be emitted at the emission face thereof into the optical fiber butted thereagainst, and some will be reflected from that interface to be transmitted through the interior of that diode to the opposite surface where these wave portions are again reflected to return to this same interface $\tau_s$ seconds later as the geometrical structure determined round trip propagation time. As is well known, the amplitude of these returning waves will be $r_1 r_2 g$ where $r_1$ and $r_2$ are the reflection coefficients at the diode emission surface and the diode surface opposite thereto, and g is the gain in the effective resonance cavity established between these surfaces. Thus, the total of the emitted electromagnetic waves, considering multiple, back-and-forth reflections can be written as:

$$E_{Tot}(t) \simeq E(t) + r_1 r_2 g E(t - \tau_s) + r_1^2 r_2^2 g^2 E(t - 2\tau_s) + \ldots$$

The complex degree of coherence function for the electromagnetic waves emitted by source 11, or its normalized autocorrelation function, in accord with the foregoing can be written as:

$$\gamma(T) = \frac{<E_{Tot}(t) E_{Tot}^*(t - T)>}{|E_{Tot}(t)|^2}$$

with T being the relative retardation delay time between the two wave representations in the numerator. Substitution of the expression above for $E_{Tot}(t)$ yields:

$$\gamma(T) \approx \frac{<(E(t) + r_1 r_2 g E(t - \tau_s) + \ldots)(E^*(t - T) + r_1 r_2 g E^*(t - \tau_s - T) + \ldots)>}{|E_{Tot}(t)|^2}$$

Figure 3:
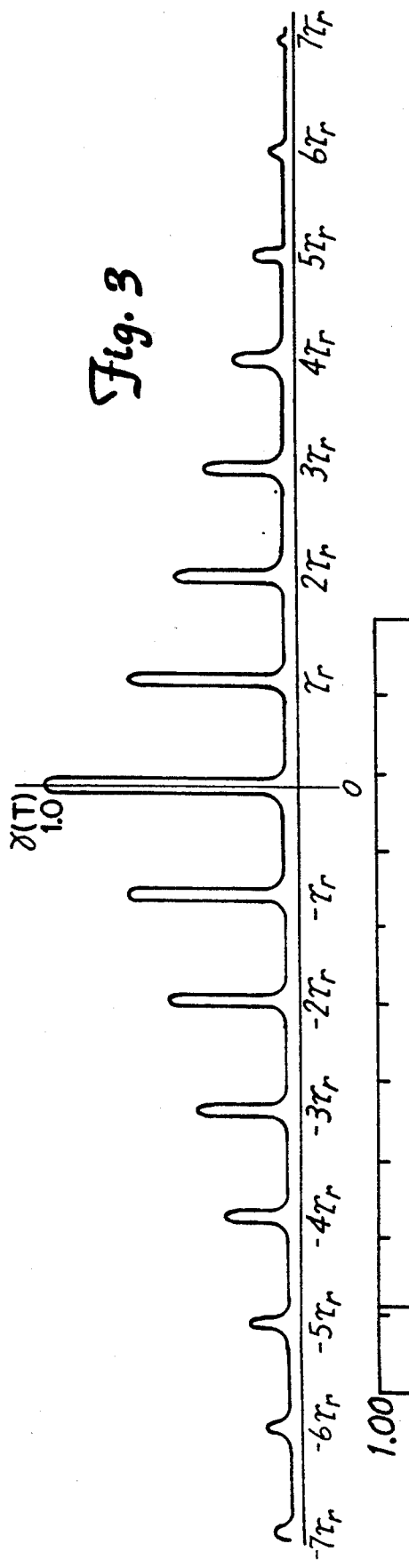
FIG. 3 shows a graph describing an aspect of an electromagnetic wave source.
Figure 4:
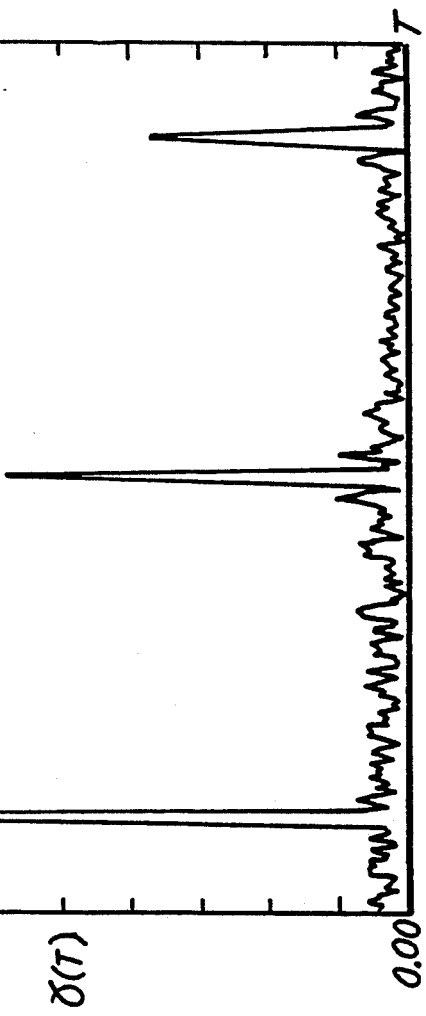
FIG. 4 shows a graph describing an aspect of an electromagnetic wave source.

Since for the spontaneous emission $<E(t)E^*(t-T)> \simeq 0$ unless $T \simeq 0$, this last expression has the values:

$$\gamma(T) = 1 \text{ for } T = 0$$
$$\approx r_1 r_2 g \text{ for } T = \pm\tau_s$$
$$\approx r_1^2 r_2^2 g^2 \text{ for } T = \pm 2\tau_s$$
etc.

and has a value of approximately zero for other values of T. However, dispersion within the laser diode will lead to some broadening of the peaks about the multiples of the effective retardation time interval delays $\tau_r$, set by the laser diode geometrical structure round trip propagation time of the same duration ($\tau_s = \tau_r$), along retardation delay time axis T to thereby extend over fractions of delays $\tau_r$ at the opposite ends of each, and will lead to some diminution of the values of those peaks. Such a source normalized autocorrelation function is shown in FIG. 3 for a laser diode operating below the lasing threshold of $r_1 r_2 g = 1$. A portion of a measured source function is shown in FIG. 4. The peaks in each instance are separated in retardation delay time by time durations, or retardation interval delays $\tau_r$, on the order of $7 \times 10^{-12}$ seconds. The half-power width in time of the peaks is representative of the coherence time of the laser diode operating below threshold, and is typically around $5 \times 10^{-14}$ seconds.

Some potential sources for source 11 have considerably more complicated complex degree of coherence functions. Some broadband semiconductor sources, for instance, have absorptive material in the resonant cavity portion thereof which thereby provides multiple paths for electromagnetic radiation therein, and so a number of different geometrical structure round trip propagation times, $\tau_{s-i}$. Each such propagation time leads to a corresponding set of peaks in the complex degree of coherence function which may so densely overlap so as to make difficult or impossible to find any repetitive, relatively large low function value ranges as effective repetitive retardation intervals. Such sources often have fairly rapidly decaying complex degree of coherence functions. These functions typically are at very low values for all retardation times exceeding four times the single pass propagation delay through the longest linear dimension of the complex cavity in such sources in which the electromagnetic waves to be emitted are generated.

The total phase error due to all splices, $\Delta\phi_{AmplTot-as}$, set out in the expression given above therefor, can be avoided in the system of FIG. 2 by keeping the complex degree of coherence function therein, $$\gamma(\Delta\tau_{1\theta i\theta j}),$$

relatively small for each pair of known coupling locations $\theta$ and $\psi$. Such known coupling locations occur at optical fiber splices with other pieces of fiber, or with other optical components, and occurs within the coupling regions in directional couplers 12 and 17. Such avoidance of amplitude related phase error can be achieved by keeping these known kinds of coupling locations spaced apart from one another such that all of the corresponding $$(\Delta\tau_{1\theta i\psi j})$$

between each such pair of coupling locations correspond to negligibly small values for the corresponding complex degree of coherence function $$\gamma(\Delta\tau_{1\theta i\psi j}).$$

Thus, measuring the complex degree of coherence function for source 11 permits determining the retardation time intervals $\tau_r$ associated therewith. Then the differences in time between propagations of electromagnetic waves in the two orthogonal polarization modes in the single spatial mode optical fiber is measured (manufacturers may specify this as the fiber "beat length"), and such time differences are measured for any optical integrated chip waveguides being used which have two such polarization modes (perhaps, in each of these kinds of waveguide, averaging the measurements over fibers or chips from different lots or from different manufacturers if such is being used). These measurement results provide a basis for knowing what the polarization modes propagation velocity difference time is for a selected length of fiber or chip waveguides. Then, the system of FIG. 2 is assembled with lengths of optical fiber, or lengths of integrated optics chip waveguides, being chosen so such coupling points on either side of polarizer 15 are appropriately separated such that the polarization modes propagation velocity time differences between any two of them from opposite sides of polarizer 15 have values falling between the peaks of the complex degree of coherence function where it has a low value for that pair of coupling points.

Of course, as can be seen in FIG. 3, if the fiber used is sufficiently long between a pair of coupling points, the complex degree of coherence function will have become negligible even at the peaks therein. However, polarization maintaining fiber is relatively expensive and so there is a desire to use relatively little of it. Thus, by allowing the length used to be such that the polarization propagation velocity difference times fall between the peaks, but out to no more than the fourth peak, for instance, relatively shorter lengths of such fiber may be used while still avoiding amplitude type phase error. On the other hand, achieving the maximum amount of fiber by causing the time to fall between the zeroth and the first peak is usually difficult to do because the optical path length differences introduced by optical path components, such as polarizer 15, often introduce differences in the propagation times between the electromagnetic waves in the two polarization modes which approach in value the first retardation interval in the complex degree of coherence function of source 11.

Figure 5:
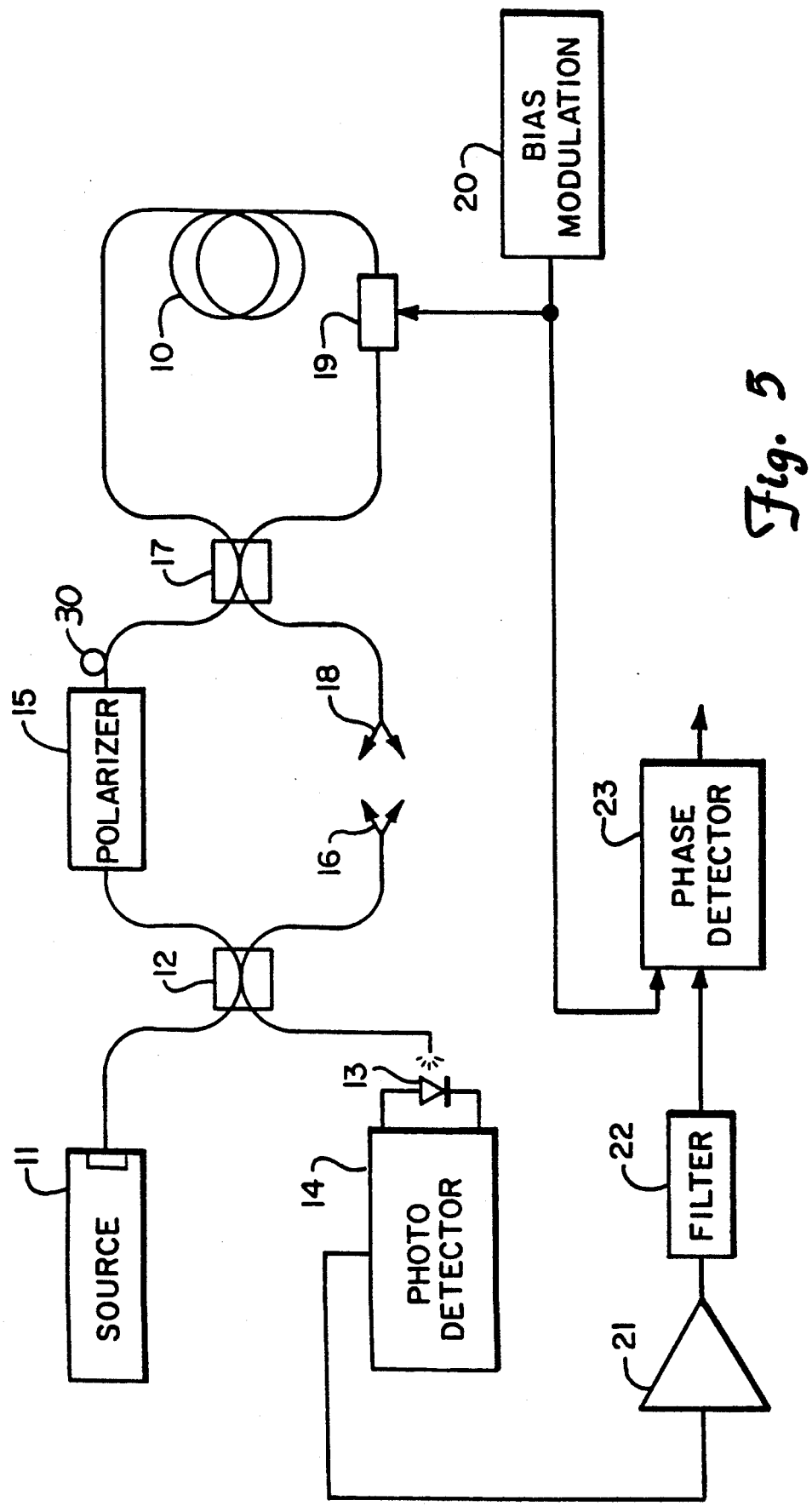
FIG. 5 shows a block diagram of a system embodying the present invention.

Thus, there will often be a need to introduce some additional polarization maintaining optical fiber to achieve the desired optical path length separations between the significant system coupling points, which are typically due either to the directional couplers used or to misalignments of the optical fiber birefringence axes on either side of a splice between pieces of such fiber being used, both in the splices to the left of polarizer 15 and in those to the right of coupler 17. Such an arrangement is shown in FIG. 5 where an additional length of polarization maintaining fiber, 30, is positioned between polarizer 15 and coupler 17 as an optical path length setting adjustment to assure that the propagation time differences between the electromagnetic waves traveling in opposite polarization modes between coupling points to the left of polarizer 15 and the coupling points in and to the right of coupler 17 have error reducing values. That is, that these propagation time differences are equal to time values occurring in one of the first few retardation intervals (in the first four or so) of, and away from the peaks in, the complex degree of coherence function, or autocorrelation function, of source 11 (at least in those instances where these functions do effectively have retardation intervals free of peaks to some significant extent).

Typically, the optical path length adjustment due to fiber 30 places the time difference in propagation of electromagnetic waves in the two polarization modes between such a pair of coupling points on the opposite sides of polarizer 15 in the second retardation interval between the first and second peaks after the zeroth peak in the complex degree of coherence function to reduce the amount of fiber used. This is relatively easily accomplished if the construction to the left of polarizer 15 is such that the time difference in propagation between electromagnetic waves in two opposite polarizations between source 11 and polarizer 15 is less than 20% of a retardation interval. In those circumstances, all of the coupling points between source 11 and polarizer 15 can be treated as having essentially the same distance between them and any of the coupling points occurring in and to the right of coupler 17.

Of course, the amplitude phase errors can be eliminated completely if the adjustment optical fiber 30 is made sufficiently long so as to leave the time differences in propagation between electromagnetic waves in the opposite polarization modes between the coupling points to the left of polarizer 15 and those to the right of coupler 17 so long as to be beyond all of the significant peaks in the complex degree of coherence function. Then, there will be no significant peaks to lead to any significant errors. On the other hand, this is a relatively expensive solution because of the substantial amount of polarization maintaining optical fiber needed which typically amounts to eight to 20 or more meters of high birefringence polarization maintaining optical fiber. Avoiding pairs of coupling points being spaced by an integer number of refraction intervals greater than 5 is difficult because of the increasing total amount of birefringence change due to temperature changes for such longer fiber lengths. In those circumstances, some temperatures will result in the polarization mode propagation time difference between a pair of coupling points being at a complex degree of coherence function peak. Thus, choosing a shorter amount of fiber for adjustment fiber 30 placing such polarization mode propagation time differences between coupling point pairs at values between early peaks in the complex degree of coherence function, such as in the second retardation interval between the first and second peaks, is an attractive way of reducing cost while simultaneously optimizing performance. With this construction, a typical length for optical path adjustment optical fiber 30 is typically one to two meters.

The last equation for the amplitude type phase error, $\Delta\phi_{AmplTot-as}$, shows another way of eliminating that error, this through setting $P_u = P_v$ for a coupling location to the left of polarizer 15. Such a result can be accomplished by introducing a splice relatively near or at source 11 in which the birefringent axis on one side of the splice is approximately at equal angles with the pair of birefringent sources on the opposite side, i.e. a 45° angle between the birefringent axis on one side and each of those on the other side of the splice ("45° splice"). In such a manner, the optical power along one birefringent axis of one side of the splice will be approximately equally coupled into the two axes on the opposite side of the splice to satisfy this last equation and so eliminate or greatly reduce $\Delta\phi_{AmplTot-as}$ due to the other coupling points to the left of polarizer 15.

Thus, this arrangement, in effect, provides a major coupling point relatively near source 11 which makes a very large contribution to amplitude type phase error in the system, but eliminates or substantially reduces the other coupling points as sources of such error through providing equal optical power in each polarization mode between it and polarizer 15. Through further incorporating an optical path length setting optical fiber between this splice and polarizer 15, or on the other side thereof, the complex degree of coherence function associated with this major coupling point can be made quite small.

The arrangement having the added optical fiber length between the splice and polarizer 15 is particularly attractive when using an integrated optics chip containing the polarizer, loop coupler and phase modulator. The time delay difference between the two polarizations propagating through the chip are not easily adjusted. The splice connecting the source coupler to the polarizer and the splices connecting the integrated optic chip to the fiber coil may be spaced such that the difference in time delays for the two polarizations to traverse such a path is approximately one retardation interval. Especially in the situation of a source being used that has a complex cavity as described above, keeping the value of $\gamma(\Delta\tau_{74\ h/j})$ sufficiently small for these polarization coupling points may be impossible. A 45° splice to the left of polarizer 15 and also left of the splices which are of concern, such as the one connecting the source coupler to the polarizer, protects the optical gyroscope system from errors generated by such coupling points.

However, in this situation, the 45° splice itself can provide a major source of error and must be kept at proper distances from polarization coupling points in the loop. This can be accomplished either by locating the 45° splice (a) a sufficient optical path distance to the left of polarizer 15 so that the polarization mode propagation time differences between it and the known polarization coupling points in the loop occur between peaks in the complex degree of coherence function, or (b) a long optical path distance from the loop. A long optical path distance typically sufficient for this purpose is one providing polarization mode propagation time differences greater than two retardation intervals or, in the case of a complex cavity source, greater than four times the single pass delay time through the source's maximum cavity dimension.

The added optical path distance between polarizer 15 and the 45° splice to the left thereof, in the first instance (a) of the two instances just set out, needed to place the propagation time difference at a value equal to retardation time values occurring between the coherence function peaks can be quite small if an integrated optic chip is used exhibiting a propagation time difference thereover of about one retardation interval. For such a situation, the added delay provided by an added length of optical fiber can be as short as a coherence length of source 11 to assure placing the propagation time difference past the first peak in the function over retardation time after the zeroth peak.

Figure 6:
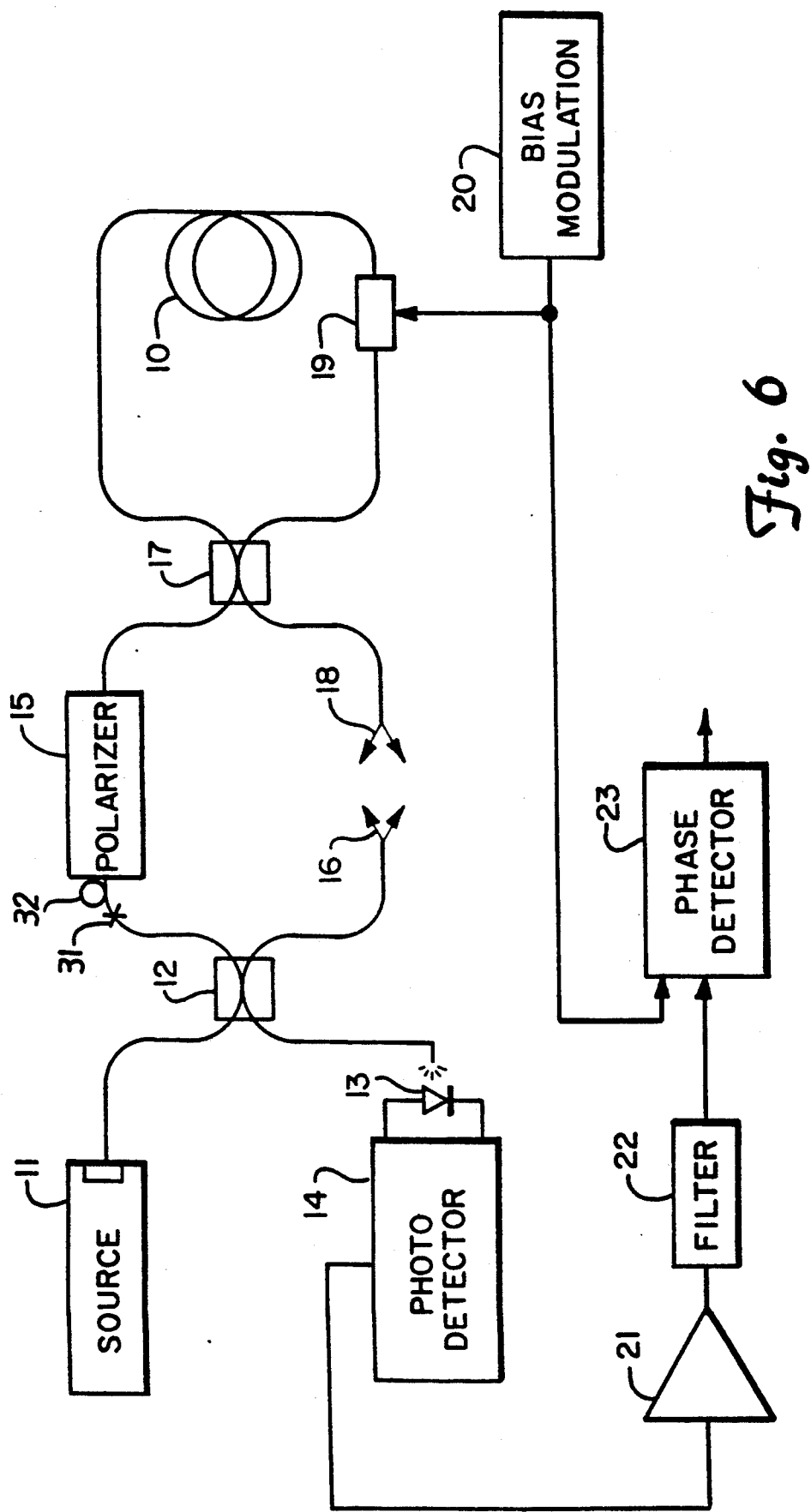
FIG. 6 shows a block diagram of a system embodying the present invention.

Such an arrangement is shown in FIG. 6 where a 45° splice, 31, between two pieces of optical fiber is made between coupler 12 and polarizer 15 at a location marked by an "x", again meaning that splice 31 has the sets of birefringent axes on either side thereof at a 45° rotational offset to one another. An additional length of polarization maintaining fiber, 32, is positioned between polarizer 15 and splice 31 again as an optical path length setting adjustment. That is, this added optical fiber of an appropriate length assures that the propagation time differences between the electromagnetic waves traveling in opposite polarization modes between splice 31 (including any coupling points to the left thereof) and the coupling points in and to the right of coupler 17 are equal to times in the first few retardation intervals (again within four is typical) of, and away from the peaks of, the source 11 complex degree of coherence function, or autocorrelation function.

Figure 7:
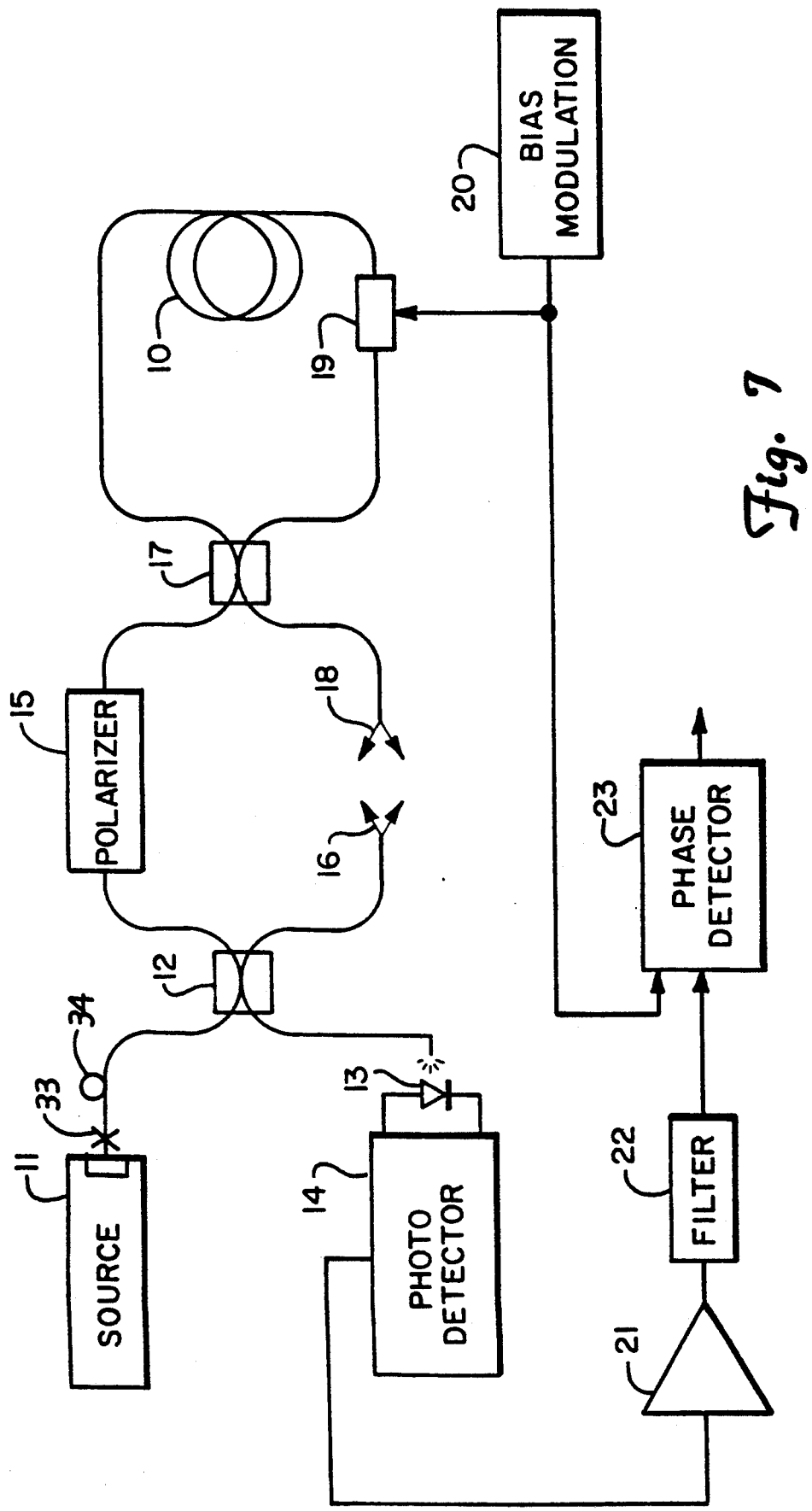
FIG. 7 shows a block diagram of a system embodying the present invention.
Figure 8:
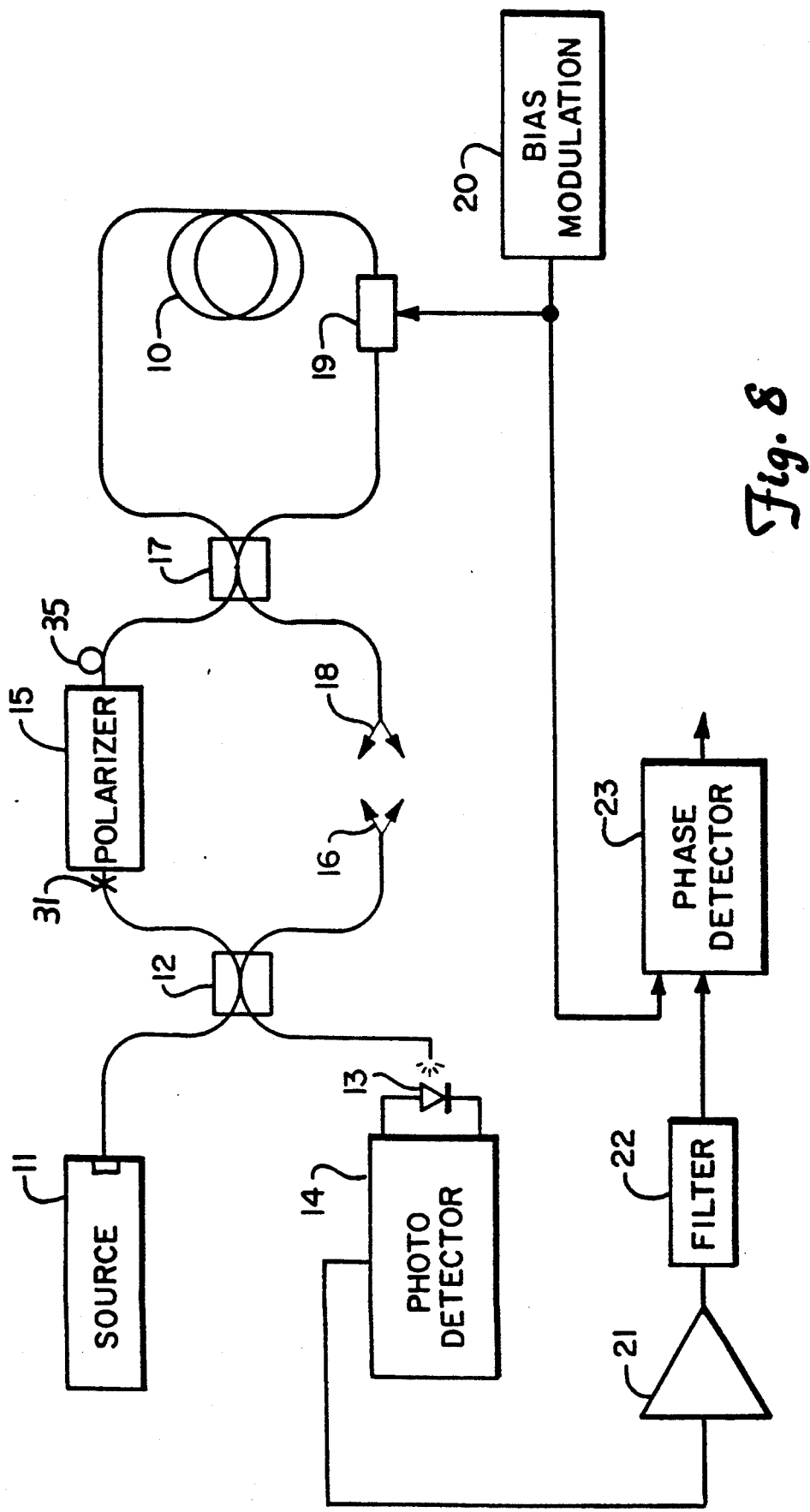
FIG. 8 shows a block diagram of a system embodying the present invention.
Figure 9:
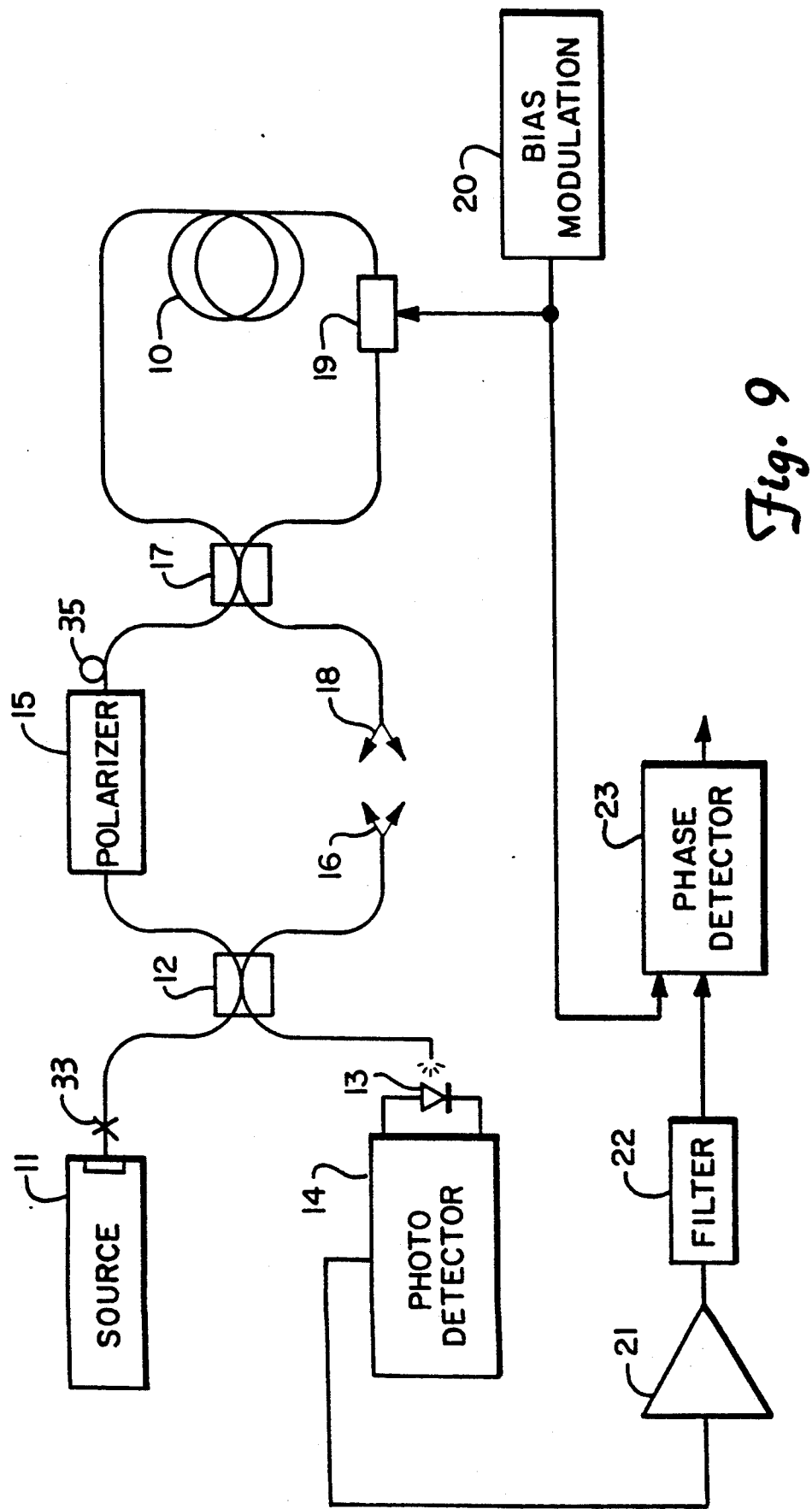
FIG. 9 shows a block diagram of a system embodying the present invention.

Variations in the system arrangement of FIG. 6 can also be used so long as the 45° splice remains relatively close to source 11 and the optical path length setting adjustment added optical fiber is between this 45° splice and coupler 17 on either side of polarizer 15. Thus, FIG. 7 shows both a 45° splice, 33, and an added optical fiber portion, 34, between source 11 and coupler 12 with, of course, splice 33 being closer to source 11 than added fiber portion 34. FIGS. 8 and 9 retain 45° splices 31 and 33 at the same system locations in which they are located in the systems of FIGS. 6 and 7, respectively. In each of FIGS. 8 and 9, however, the added optical fiber portion, 35, is located in the system between polarizer 15 and coupler 17 instead of being on the source side of polarizer 15 which is satisfactory if an integrated optics chip containing polarizer 15, loop coupler 17 and phase modulator 19 is not being used.

That is, the configurations shown in FIGS. 6 and 7 are advantageous if an integrated optics chip is to be used for phase modulator 19, since polarizer 15 and coupler 17 are usually integrated on the same chip. The integration of polarizer 15 and coupler 17 prevents placing added optical fiber between them resulting in the configurations of FIGS. 6 and 7 being better suited for integrated optics chips than are the configurations of FIGS. 8 and 9.

Once again, determining the proper length for the added optical fiber portions 32, 34 and 35 is relatively easy if the construction to the left of the 45° splices 31 and 33 is such that the time difference in propagation between electromagnetic waves in two opposite polarizations between source 11 and these splices is less than 20% of a retardation interval. Again, such an arrangement allows all of the coupling points between source 11 and the 45° splices to be treated as having essentially the same distance between them and any of the coupling points occurring in and to the right of coupler 17.

Choosing a length for the added optical fiber portion such that the propagation time differences between the electromagnetic waves traveling in opposite polarization modes between coupling points to the left of polarizer 15, including a 45° splice, and the coupling points in and to the right of coupler 17 are equal to time values occurring in one of the first few retardation intervals (in the first four or so) of, and away from the peaks in, the complex degree of coherence function, or autocorrelation function, of source 11 can be difficult or impossible for some kinds of sources. If a source has such a density of peaks along the retardation time axis that no significant retardation intervals exist therealong, as described above, such an optical path length adjustment may not be feasible. In such circumstances, the length of the added optical fiber must be sufficiently long to result in such time differences being equal to time values occurring along the retardation time axis past the peaks which have significant values. In any event, the foregoing systems described for eliminating or reducing amplitude related phase error can be implemented without the need for added birefringence modulators.

Two other considerations must be taken into account in determining the lengths of the added optical fiber portions provided in the systems described above. There is the possibility that in assembling the optical portions of the systems described that, rather than aligning the fast birefringence axes on either side of a splice between optical fibers or between a fiber and another optical component, and so also the slow axes, the slow axis and the fast axis may instead be aligned. Thus, even though the slow birefringent axis has been chosen as the axis along which major optical power is to flow in the systems described through aligning the transmitting axis of polarizer 15 therewith, quite often the fast axis of phase modulator 19 will be aligned with the slow axes of the optical fiber on either side thereof in the loop to the right of coupler 17 because the fast axis of modulator 19 has better modulation properties.

In such circumstances, the electromagnetic wave propagating along the slow axis of the optical fiber speeds up through the modulator before slowing again after exiting that component, and vice verse for the wave along the fast axis of the fiber, thereby reducing the propagation time difference between these two waves. Thus, the propagation time difference across the modulator, or any other component with oppositely aligned birefringence axes, must be subtracted from the propagation time difference found for propagating over the fiber portions between two selected points of interest on either side of the component to determine the actual propagation time difference between these two points.

The other consideration involves the occurrence of dispersion in the optical paths between two points of interest over which the propagation time difference is to be made equal to times in the first few retardation intervals in the complex degree of coherence function, or autocorrelation function, of source 11. The presence of dispersion means added delays—either fixed delays or group delays or several differing group delays one in each of several corresponding frequency bands—must be taken into account in determining the propagation time differences between electromagnetic waves traveling in opposite polarization modes between these points. Some of these delays broaden the propagation time differences from single values to effectively a range of values which must then be made, through adding an optical fiber portion, to equal a range of values along the retardation time axis in the first few retardation intervals and away from the peaks, which may be more difficult to accomplish depending on the durations of the intervals and the ranges.

As shown above, the phase error $\Delta\phi_e$ comprised two kinds of error terms as was reflected in the equation $\Delta\phi_e = \Delta\phi_{Ampl} + \Delta\phi_{Inten}$. As indicated above, this last equation should have the notation thereof changed when the source spectrum is taken into account to more fully indicate its sweep for pairs of splices, i.e. $\Delta\phi_e = \Delta\phi_{AmplTot-max} + \Delta\phi_{IntenTot-max}$. Because of the cumulative nature of the phase errors due to each pair of splices considered alone, the last expression, following the indications above, should be generalized further to $\Delta\phi_e = \Delta\phi_{AmplTot-as} + \Delta\phi_{IntenTot-as}$. This generalization of the additive expression for the phase error $\Delta\phi_e$, involving the amplitude related phase error and the intensity related phase error, will be seen to hold for the intensity phase error, consideration of which will begin again with the term $\Delta\phi_{Inten}$ since the expression therefor was given above.

Beginning with the expression for $\Delta\phi_{Inten}$ found above, but again finding the total intensity type related error, $\Delta\phi_{IntenTot}$, across the spectral width of at least source 11 once more requires taking into consideration the optical power provided at each value of the optical frequency $\nu$ in the optical frequency range of interest, or as a nominal value, $$\Delta\phi_{IntenTot} = \frac{\int |g_{xx}(\nu)\mathcal{E}_x(\nu)|^2 \Delta\phi_{Inten}(\nu) d\nu}{\int |g_{xx}(\nu)\mathcal{E}_x(\nu)|^2 d\nu}$$

to yield $$\Delta\phi_{IntenTot} = \frac{\epsilon^2 \int Im\{g_{xy}^*(\nu)g_{yx}(\nu)[|\mathcal{E}_x(\nu)|^2 - |\mathcal{E}_y(\nu)|^2]\} d\nu}{\int |g_{xx}(\nu)\mathcal{E}_x(\nu)|^2 d\nu}$$

Once again, the evaluation of this expression based on substituting the corresponding transfer matrix elements therein is more conveniently dealt with through breaking this last expression up according to is numerator and its denominator $$\Delta\phi_{Intentot} \triangleq \frac{\epsilon^2 Im(\Delta\phi_{IntenTot-fn} - \Delta\phi_{IntenTot-sn})}{\Delta\phi_{IntenTot-d}}$$

where

-continued $$\Delta\phi_{IntenTot-fn} \triangleq \int g_{xy}^*(\nu)g_{yx}(\nu)|\mathcal{E}_x(\nu)|^2 d\nu,$$

$$\Delta\phi_{IntenTot-sn} \triangleq \int g_{xy}^*(\nu)g_{yx}(\nu)|\mathcal{E}_y(\nu)|^2 d\nu,$$

and $$\Delta\phi_{IntenTot-d} \triangleq \int |g_{xx}(\nu)\mathcal{E}_x(\nu)|^2 d\nu.$$

Again, use was made of the fact that the integral of the imaginary part of a complex variable over a real variable is equal to the imaginary part of the integral of that complex variable over the real variable. The values of the transfer matrix elements must then be substituted into these expression.

Figure 10:
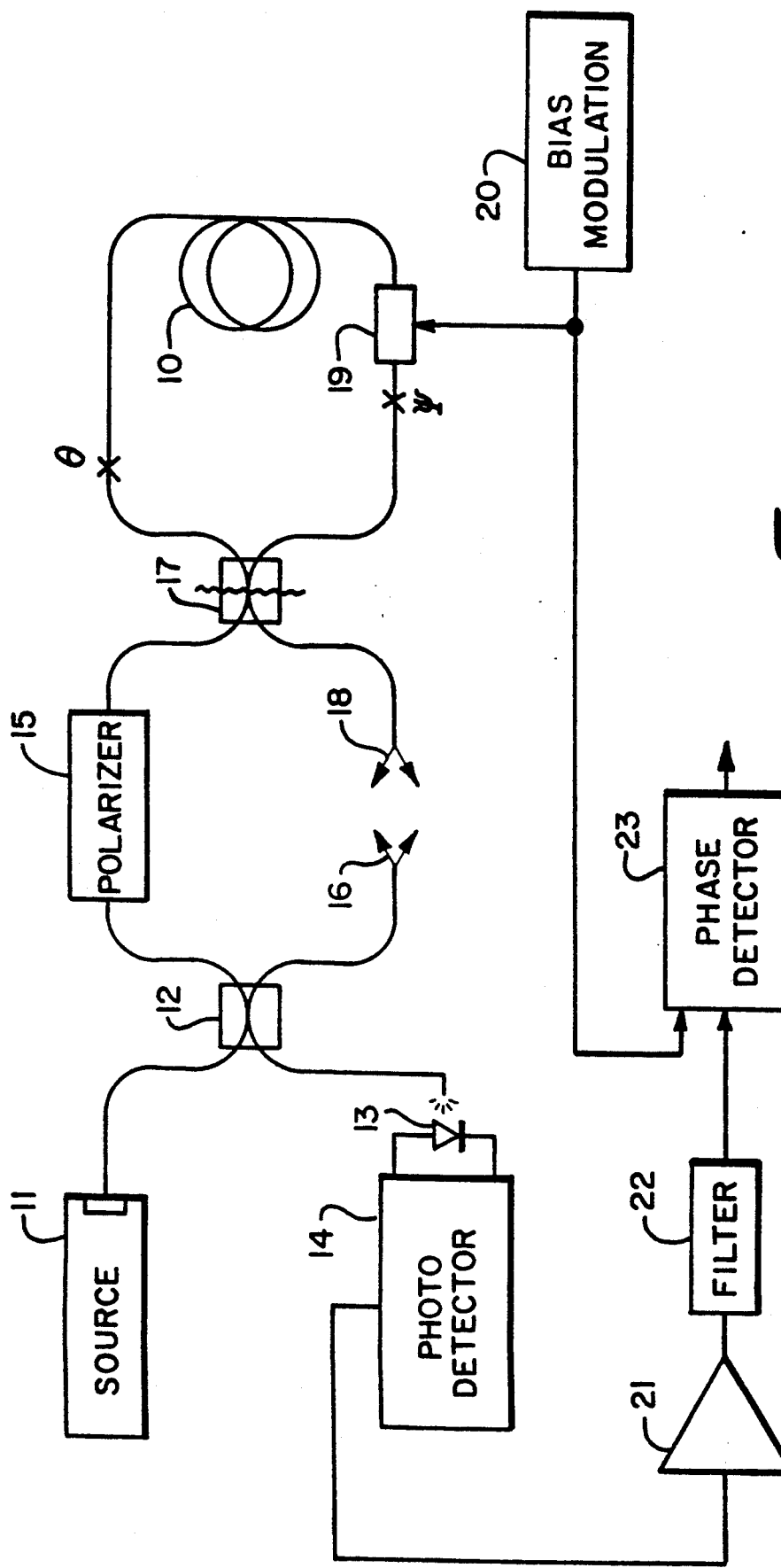
FIG. 10 shows a block diagram of a system embodying the present invention.

Because of the nature of the numerator of the last expression, this phase error can come from splices which are located symmetrically in the loop to the right of coupler 17. Thus, FIG. 10 shows use of a different pair of rotational misalignment points and a different "wavy" line reference point, but the same reference point represented by the ""wavy"" line in FIG. 2 could have been used. This is true because any rotational misalignment points between loop coupler 17 and the previous reference point will lead only to multiple misalignment point traversals, and so to only insignificant additional error because of the very small coupling occurring in splices with closely aligned principle birefringent axes on either side thereof.

Thus, a rotational misalignment error, $\theta$, is shown between the birefringent axes on either side of a splice in the upper part of the loop shown in FIG. 10 on the loop side of coupler 17. A further rotational misalignment error, $\psi$, is shown on the bottom of that loop in FIG. 10 near phase modulator 19. The "wavy" reference line is shown in the coupling region of loop coupler 17.

The same considerations in choosing the transfer matrix elements in connection with FIG. 2 apply here in connection with FIG. 10, including ignoring the time dependence which would be introduced by phase modulator 19 if taken into account and proceeding, initially, without considering group delay dispersion. Also, the length definitions change in connection with FIG. 10 from those in FIG. 2 with the length represented by L in FIG. 10 being that length between rotational misalignment points $\theta$ and $\psi$ and passing through coil 10. A further length, $l_\theta$, represents the distance between the "wavy" line reference point to the left of the coupling region in coupler 17 and the $\theta$ rotational misalignment point. Similarly, a length, $l_\psi$, represents the distance between the "wavy" line reference point in coupler 17 and the $\psi$ rotational misalignment point.

In view of these considerations, the transfer matrix elements can be written as follows:

$$g_{xx}(\nu) = p_2[e^{-j2\pi\nu(\tau l_\theta xy + \tau L_{xg} + \tau l_\psi xg)}\cos\theta\cos\psi -$$

$$e^{-j2\pi\nu(\tau l_\theta xg + \tau L_{yg} + \tau l_\psi xg)}\sin\theta\sin\psi]$$

$$g_{xy}(\nu) = p_2[e^{-j2\pi\nu(\tau l_\theta xy + \tau L_{xg} + \tau l_\psi xg)}\cos\theta\cos\psi +$$

$$e^{-j2\pi\nu(\tau l_\theta xg + \tau L_{yg} + \tau l_\psi xg)}\sin\theta\cos\psi]$$

$$g_{yx}(\nu) = p_2[-e^{-j2\pi\nu(\tau l_\theta yg + \tau L_{xg} + \tau l_\psi xg)}\sin\theta\cos\psi -$$

$$e^{-j2\pi\nu(\tau l_\theta yg + \tau L_{yg} + \tau l_\psi xg)}\cos\theta\sin\psi]$$

$$g_{xy}^*g_{yx} = -p_2^2[e^{-j2\pi\nu(\tau l_\theta yg - \tau l_\theta xg + \tau l_\psi xg - \tau l_\psi xg)}\sin\theta\cos\theta\sin\psi\cos\psi +$$

$$e^{-j2\pi\nu(\tau l_\theta yg - \tau l_\theta xg + \tau L_{yg} - \tau L_{xg} + \tau l_\psi xg - \tau l_\psi yg)}\cos^2\theta\sin^2\psi +$$

-continued
$$e^{-j2\pi\nu(\tau l_{\theta yg}-\tau l_{\theta xg}+\tau L_{xg}-\tau L_{yg}+\tau l_{\psi xg}-\tau l_{\psi yg})}\sin^2\theta\cos^2\psi +$$

$$e^{-j2\pi\nu(\tau l_{\theta yg}-\tau l_{\theta xg}+\tau l_{\psi xg}-\tau l_{\psi yg})}\sin\theta\cos\theta\sin\psi\cos\psi]$$

or $$g_{xy}^*g_{yx} = -p_2^2[e^{-j2\pi\nu(\Delta\tau l_\theta-\Delta\tau l_\psi)}2\sin\theta\cos\theta\sin\psi\cos\psi +$$

$$e^{-j2\pi\nu(\Delta\tau l_\theta-\Delta\tau l_\psi+\Delta\tau L)}\cos^2\theta\sin^2\psi +$$

$$e^{-j2\pi\nu(\Delta\tau l_\theta-\Delta\tau l_\psi-\Delta\tau L)}\sin^2\theta\cos^2\psi]$$

where $$\Delta\tau l_\theta \triangleq \tau l_{\theta yg} - \tau l_{\theta xg}; \Delta\tau l_\psi \triangleq \tau l_{\psi yg} - \tau l_{\psi xg}; \Delta\tau L \triangleq \tau L_{yg} - \tau L_{xg}.$$

Thus, these are the transfer matrix elements to be inserted in the expression for the total intensity phase error, $\Delta\phi_{IntenTot}$.

Making this insertion in the first numerator term for that quantity, and making use of the Fourier transform given above for the polarization component of the electromagnetic wave, yields:

$$\Delta\phi_{IntenTot-fn} = \int g_{xy}^*(\nu)g_{yx}(\nu)|\mathcal{E}_x(\nu)|^2 d\nu$$

$$= \lim_{T\to\infty}\left\{-2p_2^2\sin\theta\cos\theta\sin\psi\cos\psi \frac{1}{T}\int_\nu\int_{-T/2}^{T/2}\int_{-T/2}^{T/2} E_x(t)E_x^*(t') \times e^{-j2\pi\nu(t'-t+\Delta\tau l_\theta-\Delta\tau l_\psi)}dtdt'd\nu -\right.$$

$$p_2^2\cos^2\theta\sin^2\psi\frac{1}{T}\int_\nu\int_{-T/2}^{T/2}\int_{-T/2}^{T/2} E_x(t)E^*(t') \times e^{-j2\pi\nu(t'-t+\Delta\tau l_\theta-\Delta\tau l_\psi+\Delta\tau L)}dtdt'd\nu -$$

$$\left. p_2^2\sin^2\theta\cos^2\psi\frac{1}{T}\int_\nu\int_{-T/2}^{T/2}\int_{-T/2}^{T/2} E_x(t)E^*(t') \times e^{-j2\pi\nu(t'-t+\Delta\tau l_\theta-\Delta\tau l_\psi-\Delta\tau L)}dtdt'd\nu\right\}$$

Integrating over the optical frequency $\nu$, and making use of the previous expression for the Dirac delta function from generalized function theory, provides:

$$\Delta\phi_{IntenTot-fn} = -\lim_{T\to\infty}\left\{2p_2^2\sin\theta\cos\theta\sin\psi\cos\psi\int_{-T/2}^{T/2}\int_{-T/2}^{T/2} E_x(t)E_x^*(t') \times \delta(t'-t+\Delta\tau l_\theta-\Delta\tau l_\psi)dtdt' +\right.$$

$$p_2^2\cos^2\theta\sin^2\psi\int_{-T/2}^{T/2}\int_{-T/2}^{T/2} E_x(t)E_x^*(t) \times \delta(t'-t+\Delta\tau l_\theta-\Delta\tau l_\psi+\Delta\tau L)dtdt' +$$

$$\left. p_2^2\sin^2\theta\cos^2\psi\int_{-T/2}^{T/2}\int_{-T/2}^{T/2} E_x(t)E_x^*(t) \times \delta(t'-t+\Delta\tau l_\theta-\Delta\tau l_\psi-\Delta\tau L)dtdt'\right\}$$

Using the sifting property of the Dirac delta function, and using again the definition of the time average given above, results in the following:

$$\Delta\phi_{IntenTot-fn} =$$
$$-2p_2^2\sin\theta\cos\theta\sin\psi\cos\psi <E_x(t)E_x^*(t-(\Delta\tau l_\theta-\Delta\tau l_\psi))> -$$
$$p_2^2\cos^2\theta\sin^2\psi <E_x(t)E_x^*(t-(\Delta\tau l_\theta-\Delta\tau l_\psi+\Delta\tau L))> -$$
$$p_2^2\sin^2\theta\cos^2\psi <E_x(t)E_x^*(t-(\Delta\tau l_\theta-\Delta\tau l_\psi-\Delta\tau L))>$$

Thus, the total intensity error first numerator term can be seen to comprise three terms based on the time average of one of the electromagnetic wave polarization components. This time average, in the last two terms, involves the delay around the coil 10 so that these terms must average to zero because of the lack of any correlation between a component and itself delayed so long. As a result, the first term can be written:

$$\Delta\phi_{IntenTot-fn} = -2p_2^2\sin\theta\cos\theta\sin\psi\cos\psi <E_x(t)E_x^*(t-(\Delta\tau l_\theta-\Delta\tau l_\psi))>$$

Again, however, the foregoing procedure cannot be used if significant second order dispersion, or group delay dispersion is present, i.e. where $$\frac{d^2n(\nu)}{d\nu^2}$$

is present. Once again the difficulty is that the relationship giving the Dirac delta function from generalized function theory cannot be properly invoked where the delay times in the exponent in the exponential term under the integral are a function of the optical frequency $\nu$. The effect here, too, is to effectively broaden the relative polarization component relay difference terms $\Delta\tau_L$, $\Delta\tau l_\theta$ and $\Delta\tau l_\psi$. Such a result will have no significant effect in connection with the last two terms in the first numerator term contribution to the total amplitude phase error because the long delay time through coil 10 will still result in a zero value average. However, such a result will change the first term in the first numerator term contribution from the result obtained therefrom to provide the last expression for the first numerator term.

In such a situation, the emitted radiation from source 11 leaving the "wavy" reference point, $\mathcal{E}_x(\nu)$ and $\mathcal{E}_y(\nu)$, must be separated into optical frequency bands sufficiently narrow so that the group delay dispersion becomes negligible within each such band. Then the Dirac delta function can be used in each such band, and the proper result can be found again based on a sum of time averages rather than on a single time average as in the previous expression to thereby effectively give the broadening mentioned above.

Since the other, or second, electromagnetic wave polarization component enters the equation for total intensity related phase error in an entirely symmetrical way, other than for its algebraic sign which is not included in the second numerator term $\Delta\phi_{IntenTot-sn}$ as defined, the total intensity phase error numerator second term can be similarly written:

$$\Delta\phi_{IntenTot-sn} = -2p_2^2 \sin\theta\cos\theta\sin\psi\cos\psi <E_y(t)E^*_y(t-(\Delta\tau_{l\phi}-\phi\tau_{h\psi}))>$$

The effect of second order dispersion would also be the same in connection with this second numerator term.

The denominator of the total intensity related phase error expression is also found after substituting the corresponding transfer matrix element therein, or $$\Delta\phi_{IntenTot-d} = \int |g_{xx}(\nu) \mathcal{E}_x(\nu)|^2 d\nu$$

$$= \int |p_2 e^{-j2\pi\nu(\tau_{l\theta xg}+\tau_{Lxg}+\tau_{l\psi xg})}\cos\theta\cos\psi - e^{-j2\pi\nu(\tau_{l\theta xg}+\tau_{Lyg}+\tau_{l\psi xg})}\sin\theta\sin\psi \; \mathcal{E}_x(\nu)|^2 d\nu$$

$$= p_2^2 \int \{\cos^2\theta\cos^2\psi + \sin^2\theta\sin^2\psi - \cos\theta\sin\theta\cos\psi\sin\psi[e^{-j2\pi\nu(\tau_{Lyg}-\tau_{Lxg})} + e^{-j2\pi\nu(\tau_{Lxg}-\tau_{Lyg})}]\} \times |\mathcal{E}_x\nu|^2 d\nu$$

Again, the Fourier transform for the propagating wave polarization component $\mathcal{E}_x(\nu)$ is substituted, and generalized function theory again results in each of the exponential terms leading to a Dirac delta function.

Applying the sifting property of such a delta function will yield the electromagnetic wave propagating polarization component in the time domain $E_x(t)$ being in a product with a delayed version of itself. This delay, being based on the difference in the delays of each of the polarization components traveling through the relatively long optical path provided by coil 10, means that there will be essentially no correlation in that the terms based on these exponentials will have a value of zero. As a result, and again noting that the time average of a polarization component is equal to the absolute value of the square thereof which is also the optical power represented by that component, the total intensity related phase error denominator term becomes:

$$\Delta\phi_{IntenTot-d} = p_2^2(\cos^2\theta\cos^2\psi + \sin^2\theta\sin^2\psi)<|E_x(t)|^2>$$

$$= p_2^2(\cos^2\theta\cos^2\psi + \sin^2\theta\sin^2\psi)P_x$$

In such circumstances, second order dispersion will also have no effect on the denominator term.

Thus, the total intensity related phase error is:

$$\Delta\phi_{IntenTot} = \frac{\epsilon^2 Im(\Delta\phi_{IntenTot-fn} - \Delta\phi_{IntenTot-sn})}{\Delta\phi_{IntenTot-d}} \times$$

$$\epsilon^2 Im\{-2p_2^2\sin\theta\cos\theta\sin\psi\cos\psi[<E_x(t)E_x^*(t-(\Delta\tau_{l\theta}-\Delta\tau_{h\psi}))> + <E_y(t)E_y^*(t-(\Delta\tau_{l\theta}-\Delta\tau_{h\psi}))>]\} \times$$

$$\frac{1}{p_2^2(\cos^2\theta\cos^2\psi + \sin^2\theta\sin^2\psi)P_x}$$

The time averages of the numerator, or the autocorrelation functions of the polarization components of the propagating electromagnetic wave, can be written as the optical power of the particular component times its complex degree of coherence by definition as given above:

$$<E_x(t)E_x^*(t-(\Delta\tau_{l\theta}-\Delta\tau_{h\psi}))> = P_x\gamma_x(\Delta\tau_{l\theta}-\Delta\tau_{h\psi});$$

$$<E_y(t)E_y^*(t-(\Delta\tau_{l\theta}-\Delta\tau_{h\psi}))> = P_y\gamma_y(\Delta\tau_{l\theta}-\Delta\tau_{h\psi})$$

Again, for many practical sources the emitted components have the same optical spectra and so the polarization components of the propagating electromagnetic wave beginning at coupler 17 also do. The result is the complex degree of coherence is the same for both polarization components of the wave, or $$\gamma(\Delta\tau_{l\theta}-\Delta\tau_{h\psi}) \triangleq \gamma_x(\Delta\tau_{l\theta}-\Delta\tau_{h\psi}) = \gamma_y(\Delta\tau_{l\theta}-\Delta\tau_{h\psi})$$

In these circumstances, the total intensity phase error is $$\Delta\phi_{IntenTot} = -\epsilon^2 \frac{2\sin\theta\cos\theta\sin\psi\cos\psi}{\cos^2\theta\cos^2\psi + \sin^2\theta\sin^2\psi} \frac{P_x - P_y}{P_x} Im[\gamma(\Delta\tau_{l\theta} - \Delta\tau_{h\psi})]$$

Again, because of the close alignment of the birefringent axes on either side of a splice, the angles $\theta$ and $\psi$ at the $\theta$ and $\psi$ misalignment locations will be small so that $$\cos\theta \simeq 1; \; \cos\psi \simeq 1; \; \sin\theta \simeq \theta \triangleq k_1 \text{ and } \sin\psi \simeq \psi \triangleq k_2$$

In this situation, this last expression for the total intensity phase error can be simplified to $$\Delta\phi_{IntenTot} \approx -2\epsilon^2 k_1 k_2 \frac{P_x - P_y}{P_x} Im[\gamma(\Delta\tau_{l\theta} - \Delta\tau_{h\psi})]$$

Taking the absolute value of this last expression again results in the maximum of the total intensity related phase error, of $$\phi_{IntenTot-max} = 2\epsilon^2 \left| k_1 k_2 \frac{P_x - P_y}{P_x} \gamma(\Delta\tau_{l\theta} - \Delta\tau_{h\psi}) \right|$$

However, in the presence of further splices on the loop side of loop coupler 17, there will be comparable intensity related phase shift errors with respect to each pair of such splices. In these circumstances, the errors will linearly combine to provide a total intensity error, but there is the possibility, for each particular splice pair, of adding to or subtracting from the error. As a result, combining the various error contributions from each pairing of splices to provide the total error, $\phi_{IntenTot-as}$, requires dropping the absolute value sign to permit such cancellations and enhancements which yields:

$$\phi_{IntenTot-as} = -2\epsilon^2 \frac{P_x - P_y}{P_x} \sum_m \sum_n k_m k_n Im[\gamma(\Delta\tau_{l\theta m} - \Delta\tau_{h\psi n})]$$

Here, the subscript m refers to the $m^{th}$ coupling point and the subscript n refers to the $n^{th}$ coupling point in loop 10, i.e. the coupling points to the right of coupler 17 in FIG. 10.

Thus, intensity related phase errors occur if there are polarization modes coupling points to the right of coupler 17 in FIG. 10 that are located with sufficient symmetry with respect to the center of the loop provided to the right of coupler 17, or, equivalently, with respect to coupler 17 itself. These coupling points are, of course, also a the coupling points designated by the subscript j in the analysis of amplitude related phase error above. More generally, intensity related phase error results from interference between waves starting from the same polarization mode that couple to the other with the magnitude depending on the difference in optical power in the two modes with the waves relative phases having no effect.

Thus, avoidance of intensity related phase errors requires that the coupling points in and to the right of loop coupler 17 be located through choosing proper optical path lengths by changing proper optical fiber length or integrated optic chip waveguide dimensions, or both. These lengths and dimensions must be such that (a) the propagation time differences for electromagnetic waves in opposite polarization modes between the coupling region of coupler 17 and any coupling point relatively close to one output port thereof, and (b) the propagation time differences for electromagnetic waves in opposite polarization modes between the coupling region of coupler 17 and any coupling point relatively close to the other output port thereof, differ from one another in time values which are not multiples of the retardation interval of source 11. Such time values may conveniently be chosen to be in the first few retardation intervals (again within four is typical) of, and away from the peaks of, the source 11 complex degree of coherence function, or autocorrelation function. Of course, if significant dispersion is present, delays in, or extended ranges of, propagation time differences will have to be made to occur in these retardation intervals.

If such a polarization mode propagation time difference to one coupling point from the coupling region of coupler 17 is at, or near, zero, then the polarization mode propagation time differences between the coupling region of coupler 17 and any coupling point relatively close to the other output port thereof effectively must each be different from multiples of the retardation interval of source 11. Further, the polarization mode propagation time differences between the coupling region of coupler 17 and a pair of coupling points each relatively close to a different one of both output ports thereof cannot each be zero.

Alternatively, the last expression shows that intensity related phase error can be eliminated or reduced by substantially equalizing the input optical power to the two polarization modes. This can be accomplished by providing a 45° splice like splices 31 and 33 shown in corresponding ones of FIGS. 6 through 9. This is an especially appropriate choice if source 11 has such a density of peaks along the retardation time axis of its complex degree of coherence function that no significant retardation intervals exist therealong.

Clearly, the measures described in the foregoing for avoiding amplitude related phase errors and intensity related phase errors can be applied to either a closed loop or an open loop interferometric fiber optic gyroscope system and, further, these measures can be combined in a single interferometric optical fiber gyroscope system to jointly simultaneously avoid both kinds of phase errors. Such a gyroscope system can again be either closed loop or open loop.

Although the present invention has been described with reference to preferred embodiments, workers skilled in the art will recognize that changes may be made in form and detail without departing from the spirit and scope of the invention.

What is claimed is:

1. A rotation sensor capable of sensing rotation about an axis of a coiled optical fiber having a pair of principle birefringent axes, said sensing based on electromagnetic waves propagating in opposite directions in said coiled optical fiber to impinge on a photodetector with a phase relationship, said rotation sensor comprising:

a source capable of supplying an emitted electromagnetic wave characterized by an autocorrelation relationship over relative retardation time having therein a succession of peak values each separated from any other peak value adjacent thereto in said succession by a corresponding retardation interval, said autocorrelation relationship, for at least a plurality of initial ones of said retardation intervals, having values during a fraction of each that are relatively smaller than those said peak values thereof correspondingly adjacent to such retardation interval fractions;

a loop coupler having a pair of loop ports and at least one source port such that electromagnetic waves, occurring at said source port, are substantially transmitted through a coupling region in said loop coupler to thereafter occur at least in part at both of said loop ports, and such that electromagnetic waves, occurring at said loop ports, are substantially transmitted through said coupling region to thereafter occur at least in part at said source port;

a first coupling means for coupling said pair of loop ports of said loop coupler to corresponding ends of said coiled optical fiber such that electromagnetic waves, occurring at said loop ports, are substantially transmitted to said coiled optical fiber to result in electromagnetic waves propagating through said coiled optical fiber in opposite directions;

a polarizer having first and second ports each with a corresponding pair of principle polarization axes such that polarized electromagnetic waves, occurring along a transmission axis of said pair of principle polarization axes of one of said first and second ports thereof, are substantially transmitted to result in polarized electromagnetic waves appearing along said transmission axis of that remaining one of said ports, and such that polarized electromagnetic waves, occurring along a blocking axis of said pair of principle polarization axes of one of said first and second ports thereof, are substantially blocked from being transmitted to that corresponding said blocking axis of that remaining one of said ports;

a second coupling means coupling said first port of said polarizer to said source such that electromagnetic waves, emitted by said source, occur along at least said transmission principle polarization axis of said first port; and an optical path length determination means coupled between said second port of said polarizer and said source port of said loop coupler, there being a pair of sets of electromagnetic wave transmission paths with each said set having each such path therein along a corresponding one of said principle polarization axes of said polarizer, said electromagnetic wave transmission paths each (a) beginning from a corresponding wave coupling location within said second coupling means at which coupling of electromagnetic waves occurs between pairs of said paths having each pair member from a different said set, and (b) continuing through said optical path length determination means into said loop coupler to a corresponding wave coupling location within either of said loop coupler and said first coupling means at which coupling of electromagnetic waves also occurs between said pairs of said paths, said optical path length determination means being of a length such that polarized electromagnetic waves, propagating over pairs of said electromagnetic wave transmission paths containing a member from each said set to result in propagation time differences therebetween that are less than that delay equal to an initial four of said retardation intervals beginning from delay value zero, also have values for said time differences which differ substantially from delay values occurring at ends of any said initial four of said retardation intervals.

2. The apparatus of claim 1 wherein said first coupling means comprises an optical path components splice resulting in a said wave coupling location with one side of said splice being provided by a said end of said coiled optical fiber.

3. The apparatus of claim 1 wherein said second coupling means also couples said first port of said polarizer to said photodetector such that electromagnetic waves, occurring along at least one of said principle polarization axes of said first port after transmission through said polarizer, reach said photodetector.

4. The apparatus of claim 1 wherein said source is selected from a superluminescent diode and a laser diode.

5. The apparatus of claim 1 wherein said loop coupler is selected from one formed from a pair of optical fiber portions fused together with ends of said portions serving as said ports thereof, and one formed in an integrated optics chip with surfaces of waveguides at surfaces of said chip serving as said ports thereof.

6. The apparatus of claim 1 wherein said time differences in propagation over pairs of said electromagnetic wave transmission paths are less than a sum of two said retardation intervals.

7. The apparatus of claim 1 wherein said polarizer and said optical path length determination means are formed as a common structure.

8. The apparatus of claim 1 wherein any time difference in propagation over those portions of pairs of said electromagnetic wave transmission paths in said second coupling means is less than 20% of a said retardation interval.

9. The apparatus of claim 1 wherein a said wave coupling location in said second coupling means at which at least one of said electromagnetic wave transmission paths begin is a balanced wave coupling location providing sufficient coupling of electromagnetic waves, as aforesaid, so that an electromagnetic wave incident thereat from said source through one of said principle polarization axes of said polarizer leads to a substantially equal pair of electromagnetic waves departing therefrom each on a corresponding one of a pair of said electromagnetic wave transmission paths each from a different one of said pair of sets.

10. The apparatus of claim 2 wherein that other side of said optical path components splice is provided by a said loop port.

11. The apparatus of claim 2 wherein that other side of said optical path components splice is provided by an end of a phase modulator contained in said first coupling means.

12. The apparatus of claim 2 wherein said first coupling means comprises a plurality of optical path components splices each resulting in a said wave coupling location, including said splice one side of which is provided by a said end of said coiled optical fiber as a first splice and further including a second splice one side of which is provided by that remaining said end of said coiled optical fiber.

13. The apparatus of claim 3 wherein said second coupling means comprises a source coupler having a pair of source ports and at least one loop port such that electromagnetic waves, occurring at said loop port, are substantially transmitted through a coupling region in said source coupler to be at least in part at both of said source ports, and such that electromagnetic waves, occurring at said source ports, are substantially transmitted through said coupling region to thereafter occur at least in part at said loop port, said source coupler having one of said source ports thereof joined to said source to result in a said wave coupling location and having that other of said source ports joined to said photodetector, and further having said loop port joined to said polarizer first port to result in another said wave coupling location.

14. The apparatus of claim 9 wherein said balanced wave coupling location is formed from a splice of a pair of optical fibers each having a pair of principle birefringent axes, said splice capable of transmitting electromagnetic waves therethrough in either direction and is such that a said principle birefringent axis in one said optical fiber makes substantially equal angles with each of said principle birefringent axes of that one remaining.

15. The apparatus of claim 11 wherein said first coupling means comprises a further optical path components splice resulting in another said wave coupling location and joining an opposite end of said phase modulator with a said loop port.

16. The apparatus of claim 12 wherein each of said optical path components splices is separated along a corresponding separation optical path from said coupling region in said loop coupler by a corresponding length such that time differences in propagation of electromagnetic waves of opposite polarizations, propagating in each member of a pair of said separation optical paths extending from opposite ones of said loop ports, which differ from one another over each member of such pairs by values that are less than an initial four of said retardation intervals, also differ from one another by values which differ substantially from delay values occurring at ends of any of said initial four of said retardation intervals.

17. The apparatus of claim 16 wherein said values of differing between said time differences in propagation of electromagnetic waves of opposite polarization along pairs of said separation optical paths are less than a sum of two said retardation intervals.

18. The apparatus of claim 16 wherein time differences in propagation of electromagnetic waves of opposite polarizations along a said separation optical path have values which differ substantially from delay values occurring at ends of any of said initial four of said retardation intervals.

19. A rotation sensor capable of sensing rotation about an axis of a coiled optical fiber having a pair of principle birefringent axes including a fast axis and a slow axis, said sensing based on electromagnetic waves propagating in opposite directions in said coiled optical fiber to impinge on a photodetector with a phase relationship, said rotation sensor comprising:

a source capable of supplying an emitted electromagnetic wave characterized by an autocorrelation relationship over relative retardation time having therein a succession of peak values each separated form any other peak value adjacent thereto in said succession by a corresponding retardation interval, said autocorrelation relationship, for at least a plurality of initial ones of said retardation intervals, having values during a fraction of each that are relatively smaller than those said peak values thereof correspondingly adjacent to such retardation intervals;

a loop coupler having a pair of loop ports each with a pair of principal birefringent axes including a fast axis and a slow axis, and having at least one source port with a pair of principal birefringent axes including a fast axis and a slow axis, such that electromagnetic waves, occurring along said pair of principle birefringent axes of said source port, are substantially transmitted through a coupling region in said loop coupler primarily to be at least in part along corresponding ones of said pairs of principle birefringent axes of both said loop ports, and such that electromagnetic waves, occurring along said pair of principle birefringent axes of said loop ports, are substantially transmitted through said coupling region to be at least in part along corresponding ones of said pair of principle birefringent axes of said source port;

a first coupling means for coupling said loop ports of said loop coupler to corresponding ends of said coiled optical fiber such that polarized electromagnetic waves, occurring along each axis of said pairs of principle birefringent axes of said loop ports, are substantially transmitted to said coiled optical fiber to result in electromagnetic waves propagating through said coiled optical fiber in opposite directions;

a polarizer having first and second ports each with a corresponding pair of principle polarization axes such that polarized electromagnetic waves, occurring along a transmission axis of said pair of principle polarization axes of one of said first and second ports thereof, are substantially transmitted to result in polarized electromagnetic waves appearing along said transmission axis of that remaining one of said ports, and such that polarized electromagnetic waves, occurring along a blocking axis of said pair of principle polarization axes of one of said first and second ports thereof, are substantially blocked from being transmitted to that corresponding said blocking axis of that remaining one of said ports;

a second coupling means coupling said first port of said polarizer to said source such that electromagnetic waves, emitted by said source, occur along at least said transmission principle polarization axis of said first port; and an optical path length determination means having a pair of principle birefringent axes, including a fast axis and a slow axis, and coupled to said second port of said polarizer such that polarized electromagnetic waves, occurring along at least one of said principle axes of said second port of said polarizer, are substantially transmitted primarily to being along a corresponding one of said pair of principle birefringent axes of said optical path length determination means, said optical path length determination means being also coupled to said source port of said loop coupler such that polarized electromagnetic waves, occurring along at least one of said principle birefringent axes of said optical path determination means, are substantially transmitted primarily to being along a corresponding one of said pair of principle birefringent axes of said source port, there being a pair of sets of electromagnetic wave transmission paths with each said set having each such path therein along a corresponding one of said principle polarization axes of said polarizer and with said electromagnetic wave transmission paths each (a) beginning from a corresponding wave coupling location within said second coupling means at which coupling of electromagnetic waves occurs between pairs of said paths having each pair member from a different said set, and (b) continuing along those said principle birefringent axes corresponding to one another in said optical path length determination means and said loop coupler to a corresponding wave coupling location within either of said loop coupler and said first coupling means at which coupling of electromagnetic waves also occurs between said pairs of said paths, said optical path length determination means being of a length such that polarized electromagnetic waves, propagating over pairs of said electromagnetic wave transmission paths containing a member from each said set to result in propagation time differences therebetween that are less than or equal to that delay equal to an initial four of said retardation intervals beginning from delay value zero, also have values for said time differences which differ substantially from delay values occurring at ends of any of said initial four of said retardation intervals.

20. The apparatus of claim 19 wherein said first coupling means comprises an optical path components splice resulting in a said wave coupling location with one side of said splice being provided by a said end of said coiled optical fiber.

21. The apparatus of claim 19 wherein said second coupling means also couples said first port of said polarizer to said photodetector such that electromagnetic waves, occurring along at least one of said principle polarization axes of said first port after transmission through said polarizer, reach said photodetector.

22. The apparatus of claim 19 wherein said source is selected from a superluminescent diode and a laser diode.

23. The apparatus of claim 19 wherein said loop coupler is selected from one formed from a pair of optical fiber portions fused together with ends of said portions serving as said ports thereof, and one formed in an integrated optics chip with surfaces of waveguides at surfaces of said chip serving as said loop thereof.

24. The apparatus of claim 19 wherein all of said corresponding principle birefringent axes in a said electromagnetic wave transmission path in a said set are each a said fast axis.

25. The apparatus of claim 19 wherein at least one of said corresponding principle birefringent axes in a said electromagnetic wave transmission path in a said set is a said fast axis and at least one of said corresponding principle birefringent axes therein is a said slow axis.

26. The apparatus of claim 19 wherein said time differences in propagation over pairs of said electromagnetic wave transmission paths are less than a sum of two said retardation intervals.

27. The apparatus of claim 19 wherein said polarizer and said optical path length determination means are formed as a common structure.

28. The apparatus of claim 19 wherein any time difference in propagation over those portions of pairs of said electromagnetic wave transmission paths in said second coupling means is less than 20% of a said retardation interval.

29. The apparatus of claim 20 wherein that other side of said optical path components splice is provided by a said loop port.

30. The apparatus of claim 20 wherein that other side of said optical path components splice is provided by an end of a phase modulator contained in said first coupling means.

31. The apparatus of claim 20 wherein said first coupling means comprises a plurality of optical path components splices each resulting in a said wave coupling location, including said splice one side of which is provided by a said end of said coiled optical fiber as a first splice and further including a second splice one side of which is provided by that remaining said end of said coiled optical fiber.

32. The apparatus of claim 21 wherein said second coupling means comprises a source coupler having a pair of source ports each with a pair of principal birefringent axes including a fast axis and a slow axis, and having at least one loop port with a pair of principal birefringent axes including a fast axis and a slow axis, such that electromagnetic waves, occurring along said pair of principle birefringent axes of said loop port, are substantially transmitted through a coupling region in said source coupler primarily to be at least in part along corresponding ones of said pairs of principle birefringent axes of both said source ports, and such that electromagnetic waves, occurring along said pair of principle birefringent axes of said source ports, are substantially transmitted through said coupling region to thereafter occur at least in part along corresponding ones of said pair of principle birefringent axes of said loop port, said source coupler having one of said source ports thereof joined to said source to result in a said wave coupling location and having that other of said source ports joined to said photodetector, and further having said loop port joined to said polarizer first port to result in another said wave coupling location.

33. The apparatus of claim 30 wherein said first coupling means comprises a further optical path components splice resulting in another said wave coupling location and joining an opposite end of said phase modulator with a said loop port.

34. The apparatus of claim 31 wherein each of said optical path components splices is separated along a corresponding separation optical path from said coupling region in said loop coupler by a corresponding length such that time differences in propagation of polarized electromagnetic waves, propagating over principle birefringent axes in each member of a pair of said separation optical paths extending from opposite ones of said loop ports, which differ from one another over each member of such pairs by values that are less than said initial four of said retardation intervals, also differ from one another by values which differ substantially from delay values occurring at ends of any of said initial four of said retardation intervals.

35. The apparatus of claim 32 wherein said source port of said source coupler, joined with said source at an emitting surface thereof capable of emitting electromagnetic waves, has its principle birefringent axes substantially aligned with a pair of axes in that emitting surface along each of which emitted electromagnetic waves are uncorrelated with those emitted along that other.

36. The apparatus of claim 34 wherein said values of differing between said time differences in propagation of polarized electromagnetic waves over principle birefringent axes of members of pairs of said separation optical paths are less than a sum of two said retardation intervals.

37. The apparatus of claim 34 wherein time differences in propagation of electromagnetic waves of opposite polarizations along a said separation optical path have values which differ substantially from delay values occurring at ends of any of said initial four of said retardation intervals.

38. A rotation sensor capable of sensing rotation about an axis of a coiled optical fiber having a pair of principle birefringent axes including a fast axis and a slow axis, said sensing based on electromagnetic waves propagating in opposite directions in said coiled optical fiber to impinge on a photodetector with a phase relationship, said rotation sensor comprising:

a source capable of supplying an emitted electromagnetic wave characterized by an autocorrelation relationship over relative retardation time having therein a succession of peak values each separated from any other peak value adjacent thereto in said succession by a corresponding retardation interval, said autocorrelation relationship, for at least a plurality of initial ones of said retardation intervals, having values during a fraction of each that are relatively smaller than those said peak values thereof correspondingly adjacent to such retardation interval fractions;

a polarizer having first and second ports each with a corresponding pair of principle polarization axes such that polarized electromagnetic waves, occurring along a transmission axis of said pair of principle polarization axes of one of said first and second ports thereof, are substantially transmitted to result in polarized electromagnetic waves appearing along said transmission axis of that remaining one of said ports, and such that polarized electromagnetic waves, occurring along a blocking axis of said pair of principle polarization axes of one of said first and second ports thereof, are substantially blocked from being transmitted to that corresponding said blocking axis of that remaining one of said ports;

a source coupling means coupling said first port of said polarizer to said source such that electromagnetic waves, emitted by said source, occur along at least said transmission principle polarization axis of said first port;

a loop coupler having a pair of loop ports each with a pair of principal birefringent axes including a fast axis and a slow axis, and having at least one source port with a pair of principal birefringent axes including a fast axis and a slow axis, such that electromagnetic waves, occurring along said pair of principle birefringent axes of said source port, are substantially transmitted through a coupling region in said loop coupler primarily to thereafter occur at least in part along corresponding ones of said pairs of principle birefringent axes of both said loop ports, and such that electromagnetic waves, occurring along said pair of principle birefringent axes of either of said loop ports, are substantially transmitted through said coupling region to thereafter occur at least in part along corresponding ones of said pair of principle birefringent axes of said source port; and a first coupling means for coupling said pair of loop ports of said loop coupler to corresponding ends of said coiled optical fiber such that polarized electromagnetic waves, occurring along each axis of said pairs of principle birefringent axes of said loop ports, are substantially transmitted to said coiled optical fiber to result in electromagnetic waves propagating through said coiled optical fiber in opposite directions, said first coupling means having a plurality of optical path components splices each resulting in a wave coupling location at which electromagnetic waves of opposite polarizations propagating along corresponding principle birefringent axes encounter coupling to an opposite such axis, including a first splice one side of which is provided by a said end of said coiled optical fiber and further including a second splice one side of which is provided by that remaining said end of said coiled optical fiber, and with each of said optical path components splices being separated along a corresponding separation optical path from said coupling region in said loop coupler by a corresponding length to result in a loop sides time difference between those time differences in propagation of electromagnetic waves of opposite polarizations along each member of a pair of said separation optical paths extending from opposite ones of said loop ports in said loop coupler such that said loop sides time differences for pairs of said separation optical paths, having values that are less than that delay equal to an initial four of said retardation intervals beginning from delay value zero, also have values which differ substantially from delay values occurring at ends of any of said initial four of said retardation intervals.

39. The apparatus of claim 38 wherein said source coupling means also couples said first port of said polarizer to said photodetector such that electromagnetic waves, occurring along at least one of said principle polarization axes of said first port after transmission through said polarizer, reach said photodetector.

40. The apparatus of claim 38 wherein said source is selected from a superluminescent diode and a laser diode.

41. The apparatus of claim 38 wherein said loop coupler is selected from one formed from a pair of optical fiber portions fused together with ends of said portions serving as said ports thereof, and one formed in an integrated optics chip with surfaces of waveguides at surfaces of said chip serving as said loop ports thereof.

42. The apparatus of claim 38 wherein a phase modulator is spliced into that said separation optical path occurring between said first splice and said coupling region of said loop coupler.

43. The apparatus of claim 38 wherein said source coupling means comprises a source coupler having a pair of source ports and at least one loop port such that electromagnetic waves, occurring at said loop port, are substantially transmitted through a coupling region in said source coupler to be at least in part at both of said source ports, and such that electromagnetic waves, occurring at said source ports, are substantially transmitted through said coupling region to thereafter occur at least in part at said loop port, said source coupler having one of said source ports thereof joined to said source to result in a wave coupling location at which electromagnetic waves of opposite polarizations propagating along corresponding principle birefringent axes encounter coupling to an opposite such axis and having that other of said source ports joined to said photodetector, and further having said loop port joined to said polarizer first port.

44. The apparatus of claim 38 wherein said loop sides time differences are less than a sum of two said retardation intervals.

45. The apparatus of claim 38 wherein any time difference in propagation of electromagnetic waves of different polarizations in said source coupling means is less than 20% of a said retardation interval.

46. The apparatus of claim 38 wherein said loop sides time differences are each less than a sum of four said retardation intervals.

47. The apparatus of claim 38 wherein said time differences in propagation of electromagnetic waves of opposite polarizations along individual said separation optical paths have values which differ substantially from delay values occurring at ends of any of said initial four of said retardation intervals, and wherein said loop sides time differences differ from zero.

48. A rotation sensor capable of sensing rotation about an axis of a coiled optical fiber having a pair of principle birefringent axes, said sensing based on electromagnetic waves propagating in opposite directions in said coiled optical fiber to impinge on a photodetector with a phase relationship, said rotation sensor comprising:

a source capable of supplying an emitted electromagnetic wave and having a characteristic coherence time;

a loop coupler having a pair of loop ports and at least one source port such that electromagnetic waves, occurring at said source port, are substantially transmitted through a coupling region in said loop coupler to thereafter occur at least in part at both of said loop ports, and such that electromagnetic waves, occurring at either of said loop ports, are substantially transmitted through said coupling region to thereafter occur at least in part at said source port;

a first coupling means for coupling said pair of loop ports of said loop coupler to corresponding ends of said coiled optical fiber such that electromagnetic waves, occurring at said loop ports, are substantially transmitted to said coiled optical fiber to result in electromagnetic waves propagating through said coiled optical fiber in opposite directions;

a polarizer having first and second ports, each with a corresponding pair of principle polarization axes such that polarized electromagnetic waves, occurring along a transmission axis of said pair of principle polarization axes of one of said first and second ports thereof, are substantially transmitted to result in polarized electromagnetic waves appearing along said transmission axis of that remaining one of said ports, and such that polarized electromagnetic waves, occurring along a blocking axis of said pair of principle polarization axes of one of said first and second ports thereof, are substantially blocked from being transmitted to that corresponding said blocking axis of that remaining one of said ports, said second port of said polarizer being coupled to said source port of said loop coupler; and a second coupling means comprising a presplice means coupled to said source to receive electromagnetic waves, emitted by said source, for transmission to a splice end of a coupling optical fiber therein having a pair of principle birefringent axes, and further comprising a postsplice means coupled to said first port of said polarizer to receive electromagnetic waves at a splice end of a coupling optical fiber therein for transmission through an optical path length determination means therein to at least said transmission principle polarization axis of said polarizer first port, said postsplice means coupling optical fiber having a pair of principle birefringent axes, said optical path length determination means being of sufficient length such that polarized electromagnetic waves simultaneously introduced at one end thereof in alternate optical paths therethrough arrive at that end opposite with a time difference therebetween exceeding said source characteristic coherence time, said presplice means coupling optical fiber splice end being joined to said postsplice means coupling optical fiber splice end in a balanced splice through which electromagnetic waves can be transmitted in either direction and such that a said principle birefringent axis in one makes substantially equal angles with each of said principle birefringent axes of that one remaining.

49. The apparatus of claim 48 wherein said first coupling means comprises an optical path components splice resulting in a wave coupling location at which electromagnetic waves of opposite polarizations propagating along corresponding principle birefringent axes encounter coupling to an opposite such axis, one side of said splice being provided by a said end of said coiled optical fiber.

50. The apparatus of claim 48 wherein said second coupling means also couples said first port of said polarizer to said photodetector such that electromagnetic waves, occurring along at least one of said principle polarization axes of said first port after transmission through said polarizer, reach said photodetector.

51. The apparatus of claim 48 wherein said presplice means of said second coupling means further comprises a source coupler having a pair of source ports each with a pair of principal birefringent axes including a fast axis and a slow axis, and having at least one loop port with a pair of principal birefringent axes including a fast axis and a slow axis, such that electromagnetic waves, occurring along said pair of principle birefringent axes of said loop port, are substantially transmitted through a coupling region in said source coupler primarily to thereafter occur at least in part along corresponding ones of said pairs of principle birefringent axes of both said source ports, and such that electromagnetic waves, occurring along said pair of principle birefringent axes of either of said source ports, are substantially transmitted through said coupling region to thereafter occur at least in part along corresponding ones of said pair of principle birefringent axes of said loop port, said source coupler having one of said source ports thereof joined to said source to result in a wave coupling location at which electromagnetic waves of opposite polarizations propagating along corresponding principle birefringent axes encounter coupling to an opposite such axis, and having that other of said source ports joined to said photodetector, and further having said loop port serving as said presplice means coupling optical fiber splice end.

52. The apparatus of claim 48 wherein said postsplice means of said second coupling means comprises a source coupler having a pair of source ports each with a pair of principal birefringent axes including a fast axis and a slow axis, and having at least one loop port with a pair of principal birefringent axes including a fast axis and a slow axis, such that electromagnetic waves, occurring along said pair of principle birefringent axes of said loop port, are substantially transmitted through a coupling region in said source coupler primarily to thereafter occur at least in part along corresponding ones of said pairs of principle birefringent axes of both said source ports, and such that electromagnetic waves, occurring along said pair of principle birefringent axes of either of said source ports, are substantially transmitted through said coupling region to thereafter occur at least in part along corresponding ones of said pair of principle birefringent axes of said loop port, said source coupler having one of said source ports thereof coupled to said postsplice means coupling optical fiber to receive transmissions therethrough from said postsplice means coupling optical fiber splice end, and having that other of said source ports joined to said photodetector, and further having said loop port joined to said polarizer first port to result in a wave coupling location at which electromagnetic waves of opposite polarizations propagating along corresponding principle birefringent axes encounter coupling to an opposite such axis.

53. The apparatus of claim 48 wherein said source is selected from a superluminescent diode and a laser diode.

54. The apparatus of claim 48 wherein said loop coupler is selected from one formed from a pair of optical fiber portions fused together with ends of said portions serving as said ports thereof, and one formed in an integrated optics chip with surfaces of waveguides at surfaces of said chip serving as said loop ports thereof.

55. The apparatus of claim 48 wherein said polarizer and said loop coupler are each provided in a common integrated optics chip.

56. The apparatus of claim 48 wherein said optical path length determination means of said postsplice means of said second coupling means and said polarizer are formed as a common structure.

57. The apparatus of claim 48 wherein said source is characterized by an autocorrelation relationship over relative retardation time having therein a succession of peak values each separated from any other peak value adjacent thereto in said succession by a corresponding retardation interval, said autocorrelation relationship, for at least a plurality of initial ones of said retardation intervals, having values during a fraction of each that are relatively smaller than those said peak values thereof correspondingly adjacent to such retardation interval fractions.

58. The apparatus of claim 48 wherein said optical path length determination means is of sufficient length such that polarized electromagnetic waves simultaneously introduced at said balanced splice in alternate optical paths in said postsplice means coupling optical fiber arrive at said loop coupler coupling region with a time difference therebetween having a value exceeding four times that time required for electromagnetic waves in said source to propagate one way over a distance along that path therein of greatest length over which such propagation can occur.

59. The apparatus of claim 49 wherein that other side of said optical path components splice is provided by a said loop port in said loop coupler.

60. The apparatus of claim 49 wherein that other side of said optical path components splice is provided by an end of a phase modulator contained in said first coupling means.

61. The apparatus of claim 49 wherein said first coupling means comprises a plurality of optical path components splices each resulting in a said wave coupling location, including said splice one side of which is provided by a said end of said coiled optical fiber as a first splice and further including a second splice one side of which is provided by that remaining said end of said coiled optical fiber.

62. The apparatus of claim 57 wherein said optical path length determination means is of sufficient length such that polarized electromagnetic waves simultaneously introduced at said balanced splice in alternate optical paths in said postsplice means coupling optical fiber which arrive at said loop coupler coupling region with a time difference therebetween having a value that is less than that delay equal to an initial four of said retardation intervals beginning from delay value zero, also have a value for said time difference which differs substantially from delay values occurring at ends of any of said initial four of said retardation intervals.

63. The apparatus of claim 57 wherein said optical path length determination means is of sufficient length such that polarized electromagnetic waves simultaneously introduced at said balanced splice in alternate optical paths in said postsplice means coupling optical fiber arrive at said loop coupler coupling region with a time difference therebetween having a value exceeding three retardation intervals.

64. The apparatus of claim 57 wherein any time difference in propagation of electromagnetic waves in said presplice means is less than 20% of said retardation interval.

65. The apparatus of claim 58 wherein said optical path length determination means is of sufficient length such that polarized electromagnetic waves simultaneously introduced at said balanced splice in alternate optical paths in said postsplice means coupling optical fiber arrive at said loop coupler coupling region with a time difference therebetween having a value exceeding eight times that time required for electromagnetic waves in said source to propagate one way over a distance along that path therein of greatest length over which such propagation can occur.

66. The apparatus of claim 60 wherein said first coupling means comprises a further optical path components splice resulting in another said wave coupling location and joining an opposite end of said phase modulator with a said loop side port of said loop coupler.

67. A rotation sensor capable of sensing rotation bout an axis of a coiled optical fiber having a pair of principle birefringent axes, said sensing based on electromagnetic waves propagating in opposite directions in said coiled optical fiber to impinge on a photodetector with a phase relationship, said rotation sensor comprising:

a source capable of supplying an emitted electromagnetic wave;

a loop coupler having a pair of loop ports and at least one source port such that electromagnetic waves, occurring at said source port, are substantially transmitted through a coupling region in said loop coupler to thereafter occur at least in part at both of said loop ports, and such that electromagnetic waves, occurring at either of said loop ports, are substantially transmitted through said coupling region to thereafter occur at least in part at said source port;

a first coupling means for coupling said pair of loop ports of said loop coupler to corresponding ends of said coiled optical fiber such that electromagnetic waves, occurring at said loop ports, are substantially transmitted to said coiled optical fiber to result in electromagnetic waves propagating through said coiled optical fiber in opposite directions;

a polarizer having first and second ports each with a corresponding pair of principle polarization axes such that polarized electromagnetic waves, occurring along a transmission axis of said pair of principle polarization axes of one of said first and second ports thereof, are substantially transmitted to result in polarized electromagnetic waves appearing along said transmission axis of that remaining one of said ports, and such that polarized electromagnetic waves, occurring along a blocking axis of said pair of principle polarization axes of one of said first and second ports thereof, are substantially blocked form being transmitted to that corresponding said blocking axis of that remaining one of said ports;

an optical path length determination means coupled between said second port of said polarizer and said source port of said loop coupler; and a second coupling means comprising a presplice means coupled to said source to receive electromagnetic waves, emitted by said source, for transmission without passage through any birefringence modulator to a splice end of a coupling optical fiber therein having a pair of principle birefringent axes, and further comprising a postsplice means coupled to said first port of said polarizer to receive electromagnetic waves at a splice end of a coupling optical fiber therein for transmission to at least said transmission principle polarization axis of said polarizer first port, said postsplice means coupling fiber having a pair of principle birefringent axes, said presplice means coupling optical fiber splice end being joined to said postsplice means coupling optical fiber splice end in a balanced splice through which electromagnetic waves can be transmitted in either direction and such that a said principle birefringent axis in one makes substantially equal angles with each of said principle birefringent axes of that one remaining, said optical path length determination means being of sufficient length such that polarized electromagnetic waves simultaneously introduced at said balanced splice in alternate optical paths in said postsplice means coupling optical fiber arrive at said loop coupler coupling region with a time difference therebetween having a value exceeding four times that time required for electromagnetic waves in said source to propagate one way over a distance along that path therein of greatest length over which such propagation can occur.

68. The apparatus of claim 67 wherein said first coupling means comprises an optical path components splice resulting in a wave coupling location at which electromagnetic waves of opposite polarizations propagating along corresponding principle birefringent axes encounter coupling to an opposite such axis, one side of said splice being provided by a said end of said coiled optical fiber.

69. The apparatus of claim 67 said second coupling means also couples said first port of said polarizer to said photodetector such that electromagnetic waves, occurring along at least one of said principle polarization axes of said first port after transmission through said polarizer, reach said photodetector.

70. The apparatus of claim 67 wherein said presplice means of said second coupling means further comprises a source coupler having a pair of source ports each with a pair of principal birefringent axes including a fast axis and a slow axis, and having at least one loop port with a pair of principal birefringent axes including a fast axis and a slow axis, such that electromagnetic waves, occurring along said pair of principle birefringent axes of said loop port, are substantially transmitted through a coupling region in said source coupler primarily to be at least in part along corresponding ones of said pairs of principle birefringent axes of both said source ports, and such that electromagnetic waves, occurring along said pair of principle birefringent axes of said source ports, are substantially transmitted through said coupling region to be at least in part along corresponding ones of said pair of principle birefringent axes of said loop port, said source coupler having one of said source ports thereof joined to said source and having that other of said source ports joined to said photodetector, and further having said loop port serving as said presplice means coupling optical fiber splice end.

71. The apparatus of claim 67 wherein said postsplice means of said second coupling means comprise a source coupler having a pair of source ports each with a pair of principal birefringent axes including a fast axis and a slow axis, and having at least one loop port with a pair of principal birefringent axes including a fast axis and a slow axis, such that electromagnetic waves, occurring along said pair of principle birefringent axes of said loop port, are substantially transmitted through a coupling region in said source coupler primarily to be at least in part along corresponding ones of said pairs of principle birefringent axes of both said source ports, and such that electromagnetic waves, occurring along said pair of principle birefringent axes of said source ports, are substantially transmitted through said coupling region to be at least in part along corresponding ones of said pair of principle birefringent axes of said loop port, said source coupler having one of said source ports thereof serving as said postsplice means coupling optical fiber splice end, and having that other of said source ports joined to said photodetector, and further having said loop port joined to said polarizer first port.

72. The apparatus of claim 67 wherein said source is selected from a superluminescent diode and a laser diode.

73. The apparatus of claim 67 wherein said loop coupler is selected from one formed from a pair of optical fiber portions fused together with ends of said portions serving as said ports thereof, and one formed in an integrated optics chip with surfaces of waveguides at surfaces of said chip serving as said loop ports thereof.

74. The apparatus of claim 67 wherein said polarizer and said optical path length determination means are formed as a common structure.

75. The apparatus of claim 68 wherein that other side of said optical path components splice is provided by a said loop port in said loop coupler.

76. The apparatus of claim 68 wherein that other side of said optical path components splice is provided by an end of a phase modulator contained in said first coupling means.

77. The apparatus of claim 68 wherein said first coupling means comprises a plurality of optical path components splices each resulting in a said wave coupling location, including said splice one side of which is provided by a said end of said coiled optical fiber as a first splice and further including a second splice one side of which is provided by that remaining said end of said coiled optical fiber.

78. The apparatus of claim 76 wherein said first coupling means comprises a further optical path components splice resulting in another said wave coupling location and joining an opposite end of said phase modulator with a said loop side port of said loop coupler.

79. A rotation sensor capable of sensing rotation about an axis of a coiled, polarization-maintaining optical fiber, said sensing based on electromagnetic waves propagating in opposite directions in said coiled optical fiber to impinge on a photodetector with a phase relationship, said rotation sensor comprising:

a source capable of supplying emitted electromagnetic waves having polarization components characterized by an autocorrelation relationship over relative retardation time having therein a succession of peak values each separated from any other peak value adjacent thereto in said succession by a corresponding retardation interval, said autocorrelation relationship, for at least a plurality of initial ones of said retardation intervals beginning from delay value zero, having values during a fraction of each that are relatively smaller than those said peak values thereof correspondingly adjacent to said retardation interval fractions;

a polarizer means having a transmission axis and a blocking axis therein;

a first coupling means coupling said coiled, polarization-maintaining optical fiber ends to said polarizer means, said first coupling means having at least one wave coupling location therein at which (a) electromagnetic waves propagate in opposite directions that also propagate in opposite directions in said coiled optical fiber, and at which (b) there is coupling between optical transmission paths into which are primarily directed electromagnetic waves emanating from said polarizer transmission and blocking axes, respectively;

a second coupling means for coupling said polarizer means to said source and to said photo detector and comprising at least one segment of polarization-maintaining optical fiber, said second coupling means having at least one wave coupling location therein at which there is coupling between optical transmission paths into which are primarily directed electromagnetic waves polarization components emitted by said source, said wave coupling locations in said first coupling means and in said second coupling means having pairs of electromagnetic wave transmission paths between them in which each pair member passes through a different one of said polarizer means blocking and transmission axes such that polarization components of electromagnetic waves, propagating between pairs of such wave coupling locations to have propagation time differences in propagating thereover of values that are less than that delay equal to an initial four of said retardation intervals beginning from delay value zero, also have values for said time differences which differ substantially from delay values occurring at ends of said initial four of said retardation intervals.

80. The apparatus of claim 79 wherein said second coupling means comprises an optical coupler having a coupling region at which said electromagnetic waves propagating in opposite directions in said coiled, polarization-maintaining optical fiber diverge to propagate therethrough and recombine after so propagating, said ends of said coiled, polarization-maintaining optical fiber being separated from said coupling region such that a time difference between those time differences of each pair of polarization components of electromagnetic waves propagating between a corresponding said end and said coupling region, having a value less than said initial four of said retardation intervals, also has a value which differs substantially from said delay values occurring at ends of any of said initial four retardation intervals.

81. The apparatus of claim 80 wherein said time differences between a pair of polarization components of electromagnetic waves propagating from said coupling region to a corresponding end of said coiled, polarization-maintaining optical fiber are each less than a sum of said initial four of said initial retardation intervals.

82. A rotation sensor capable of sensing rotation about an axis of a coiled, polarization-maintaining optical fiber, said sensing based on electromagnetic waves propagating in opposite directions in said coiled optical fiber to impinge on a photodetector with a phase relationship, said rotation sensor comprising:

a source capable of supplying emitted electromagnetic waves having polarization components characterized by an autocorrelation relationship over relative retardation time having therein a succession of peak values each separated from any other peak value adjacent thereto in said succession by a corresponding retardation interval, said autocorrelation relationship, for at least a plurality of initial ones of said retardation intervals beginning from delay value zero, having values during a fraction of each that are relatively smaller than those said peak values thereof correspondingly adjacent to said retardation interval fractions;

an integrated optics chip having first, second and third ports such that electromagnetic waves introduced at said first port will result in electromagnetic waves appearing at said second and third ports after propagating over waveguides therein exhibiting a polarization characteristic in at least some location to establish therein a transmission axis and a blocking axis;

a first coupling means coupling each of said coiled, polarization-maintaining optical fiber ends to a corresponding one of said integrated optics chip second and third ports, at least one of said integrated optics chip and said first coupling means having at least one wave coupling location therein at which (a) electromagnetic waves propagate in opposite directions that also propagate in opposite directions in said coiled optical fiber, and at which (b) there is coupling between optical transmission paths into which are primarily directed electromagnetic waves emanating from said transmission and blocking axes of that waveguide location exhibiting said polarization characteristic, respectively; and a second coupling means for coupling said integrated optics chip first port to said source, said second coupling means having at least one wave coupling location therein at which there is coupling between optical transmission paths into which are primarily directed electromagnetic waves polarization components emitted by said source, said wave coupling locations in said first coupling means and in said second coupling means having pairs of electromagnetic wave transmission paths between them in which each pair member passes through a different one of said waveguides blocking and transmission axes such that polarization components of electromagnetic waves, propagating between pairs of such wave coupling locations to have propagation time differences in propagating thereover of values that are less than that delay equal to an initial four of said retardation intervals beginning from delay value zero, also have values for said time differences which differ substantially from delay values occurring at ends of said initial four of said retardation intervals.

83. An interferometer capable of sensing phase differences between electromagnetic waves which have propagated in opposite directions in a coiled, polarization-maintaining optical fiber to impinge on a photodetector with a phase relationship, said rotation sensor comprising:

a source capable of supplying emitted electromagnetic waves autocorrelation relationship over relative retardation time having therein a succession of peak values each separated from any other peak value adjacent thereto in said succession by a corresponding retardation interval, said autocorrelation relationship, for at least a plurality of initial ones of said retardation intervals beginning from delay value zero, having values during a fraction of each that are relatively smaller than those said peak values thereof correspondingly adjacent to said retardation interval fractions;

a polarizer means having a transmission axis and a blocking axis therein;

a first coupling means coupling said coiled, polarization-maintaining optical fiber ends to said polarizer means, said first coupling means having at least one wave coupling location therein at which (a) electromagnetic waves propagate in opposite directions that also propagate in opposite directions in said coiled optical fiber, and at which (b) there is coupling between optical transmission paths into which are primarily directed electromagnetic waves emanating from said polarizer transmission and blocking axes, respectively;

a second coupling means for coupling said polarizer means to said source and to said photodetector and comprising at least one segment of polarization-maintaining optical fiber, said second coupling means having at least one wave coupling location therein at which there is coupling between optical transmission paths into which are primarily directed electromagnetic waves polarization components emitted by said source, said wave coupling locations in said first coupling means and in said second coupling means having pairs of electromagnetic wave transmission paths between them in which each pair member passes through a different one of said polarizer means blocking and transmission axes such that polarization components of electromagnetic waves, propagating between pairs of such wave coupling locations to have propagation time differences in propagating thereover of values that are less that delay equal to an initial four of said retardation intervals beginning from delay value zero, also have values for said time differences which differ substantially from delay values occurring at ends of said initial four of said retardation intervals.

84. The apparatus of claim 83 wherein said second coupling means comprises an optical coupler having a coupling region at which said electromagnetic waves propagating in opposite directions in said coiled, polarization-maintaining optical fiber diverge to propagate therethrough and recombine after so propagating, said ends of said coiled, polarization-maintaining optical fiber being separated from said coupling region such that a time difference between those time differences of each pair of polarization components of electromagnetic waves propagating between a corresponding said end and said coupling region, having a value less than said initial four of said retardation intervals, also has a value which differs substantially from said delay values occurring at ends of any of said initial four retardation intervals.

85. The apparatus of claim 84 wherein said time differences between a pair of polarization components of electromagnetic waves propagating from said coupling region to a corresponding end of said coiled, polarization-maintaining optical fiber are each less than a sum of said initial four of said initial retardation intervals.

* * * * *